(12) United States Patent
Medalion et al.

(10) Patent No.: US 11,978,457 B2
(45) Date of Patent: May 7, 2024

(54) METHOD FOR UNIQUELY IDENTIFYING PARTICIPANTS IN A RECORDED STREAMING TELECONFERENCE

(71) Applicant: GONG.IO LTD, Ramat Gan (IL)

(72) Inventors: Shlomi Medalion, Ramat Gan (IL); Omri Allouche, Tel Aviv (IL); Rotem Eilaty, Ramat Gan (IL)

(73) Assignee: GONG.IO LTD, Ramat Gan (IL)

( * ) Notice: Subject to any disclaimer, the term of this patent is extended or adjusted under 35 U.S.C. 154(b) by 251 days.

(21) Appl. No.: 17/651,204

(22) Filed: Feb. 15, 2022

(65) Prior Publication Data

US 2023/0260520 A1    Aug. 17, 2023

(51) Int. Cl.
| | |
|---|---|
| G10L 17/18 | (2013.01) |
| G10L 15/16 | (2006.01) |
| H04L 12/18 | (2006.01) |
| H04N 7/15 | (2006.01) |

(52) U.S. Cl.
CPC .............. *G10L 17/18* (2013.01); *G10L 15/16* (2013.01); *H04L 12/1831* (2013.01); *H04N 7/15* (2013.01)

(58) Field of Classification Search
CPC ...... G06F 1/3278; G06F 40/10; G06F 40/166; G06F 40/284; G06F 40/30; G06F 40/35; G06F 16/285; G06F 16/9535; G06N 3/045; G06N 5/022; G10L 15/02; G10L 15/04; G10L 15/06; G10L 15/16; G10L 15/1815; G10L 15/19; G10L 15/22; G10L 15/26; G10L 17/00; G10L 17/06; G10L 17/14; G10L 17/18; G10L 17/24; G10L 17/26; G10L 25/54; G10L 25/57; G10L 15/063; G10L 15/1822; G10L 17/02; G10L 17/16; G10L 25/30; G10L 25/78; H04L 12/1831; H04L 65/4015; H04L 9/3231; H04N 7/15; H04N 7/155; H04N 21/44; H04N 21/44008; H04N 21/44; G06Q 10/109; G06V 10/811; G06V 20/40

See application file for complete search history.

(56) References Cited

U.S. PATENT DOCUMENTS

| | | | |
|---|---|---|---|
| 6,219,639 B1 | 4/2001 | Bakis et al. | |
| 7,831,427 B2* | 11/2010 | Potter | G10L 15/26 |
| | | | 704/235 |
| 8,214,242 B2* | 7/2012 | Agapi | G06Q 10/109 |
| | | | 705/7.19 |
| 9,479,736 B1 | 10/2016 | Karakotsios | |
| 9,571,652 B1* | 2/2017 | Zeppenfeld | H04L 9/3231 |
| 10,134,400 B2* | 11/2018 | Ziv | G10L 17/00 |
| 10,546,575 B2* | 1/2020 | Dimitriadis | G10L 15/04 |
| 11,729,009 B1* | 8/2023 | Religa | H04L 65/4015 |
| | | | 709/204 |
| 11,776,548 B2* | 10/2023 | Zhao | G10L 17/18 |
| | | | 704/232 |

(Continued)

*Primary Examiner* — Gerald Gauthier
(74) *Attorney, Agent, or Firm* — Amster, Rothstein & Ebenstein LLP

(57) ABSTRACT

Methods for uniquely identifying respective participants in a teleconference involving obtaining components of the teleconference including an audio component, a video component, teleconference metadata, and transcription data, parsing components into plural speech segments, tagging respective speech segments with speaker identification information, and diarizing the teleconference so as to label respective speech segments.

20 Claims, 20 Drawing Sheets

(56) References Cited

U.S. PATENT DOCUMENTS

| | | | |
|---|---|---|---|
| 11,790,896 B2* | 10/2023 | McDaniel | G10L 15/16 |
| | | | 704/232 |
| 11,848,025 B2* | 12/2023 | Proença | G10L 17/24 |
| 2007/0120966 A1* | 5/2007 | Murai | H04N 7/15 |
| | | | 348/E7.083 |
| 2009/0043573 A1* | 2/2009 | Weinberg | G10L 17/06 |
| | | | 704/223 |
| 2017/0004178 A1* | 1/2017 | Ponting | G06F 16/9535 |
| 2018/0097841 A1* | 4/2018 | Stolarz | G10L 15/26 |
| 2018/0166066 A1* | 6/2018 | Dimitriadis | G10L 25/78 |
| 2018/0174600 A1* | 6/2018 | Chaudhuri | H04N 21/44008 |
| 2018/0176508 A1 | 6/2018 | Pell | |
| 2018/0197548 A1* | 7/2018 | Palakodety | G10L 17/06 |
| 2018/0286412 A1* | 10/2018 | Amsterdam | G10L 17/06 |
| 2018/0376108 A1* | 12/2018 | Bright-Thomas | G06V 20/40 |
| 2019/0318743 A1* | 10/2019 | Reshef | G10L 25/78 |
| 2019/0341050 A1* | 11/2019 | Diamant | H04N 7/155 |
| 2020/0152179 A1* | 5/2020 | van Hout | G10L 15/22 |
| 2021/0065712 A1* | 3/2021 | Holm | G10L 15/02 |
| 2021/0118426 A1* | 4/2021 | Li | G10L 15/04 |
| 2021/0174783 A1* | 6/2021 | Wieman | G10L 15/1815 |
| 2021/0174806 A1* | 6/2021 | Krishnaswamy | G10L 15/22 |
| 2021/0280197 A1* | 9/2021 | Wang | G10L 15/04 |
| 2021/0343282 A1* | 11/2021 | Mane | G10L 15/22 |
| 2021/0383127 A1* | 12/2021 | Kikin-Gil | G06V 10/811 |
| 2021/0406292 A1* | 12/2021 | Burd | G06F 40/35 |
| 2022/0115019 A1 | 4/2022 | Bradley et al. | |
| 2022/0122615 A1* | 4/2022 | Chen | G10L 17/16 |
| 2022/0157322 A1* | 5/2022 | Reshef | G10L 17/02 |
| 2022/0189489 A1 | 6/2022 | Peeler et al. | |
| 2022/0335947 A1* | 10/2022 | Li | G06N 3/045 |
| 2022/0375492 A1* | 11/2022 | Grangier | G10L 15/063 |
| 2022/0405360 A1* | 12/2022 | Edwards | G10L 17/26 |
| 2022/0407900 A1* | 12/2022 | Gawande | G06F 40/10 |
| 2023/0042310 A1* | 2/2023 | Wexler | G06F 1/3278 |
| 2023/0094511 A1* | 3/2023 | Guha | G10L 15/06 |
| | | | 704/231 |
| 2023/0094828 A1* | 3/2023 | Ramsl | G06F 40/166 |
| | | | 704/235 |
| 2023/0135071 A1* | 5/2023 | Eden | G06F 40/35 |
| | | | 704/235 |
| 2023/0135179 A1* | 5/2023 | Mielke | G06N 5/022 |
| | | | 704/232 |
| 2023/0154456 A1* | 5/2023 | Bassani | G06F 40/166 |
| | | | 704/200 |
| 2023/0162733 A1 | 5/2023 | Moorsom et al. | |
| 2023/0223016 A1* | 7/2023 | Konam | G06F 40/284 |
| | | | 704/231 |
| 2023/0253015 A1* | 8/2023 | Stewart | G10L 25/57 |
| | | | 386/241 |
| 2023/0260519 A1* | 8/2023 | Medalion | G10L 17/18 |
| | | | 704/232 |
| 2023/0260520 A1* | 8/2023 | Medalion | H04N 7/15 |
| | | | 704/232 |
| 2023/0290345 A1* | 9/2023 | Joshi | G10L 15/19 |
| 2023/0297785 A1* | 9/2023 | Lamm | G06F 40/30 |
| | | | 704/232 |
| 2023/0386473 A1* | 11/2023 | Li | G10L 15/04 |
| 2023/0394226 A1* | 12/2023 | Medalion | G10L 17/14 |

* cited by examiner

{"time":36.72, "type":"SpeakersSamplingEvent", "data": {"speakers":[{"name":"John Doe"}]}}
{"time":36.937, "type":"SpeakersSamplingEvent", "data": {"speakers":[{"name":"John Doe"}]}}
{"time":37.145, "type":"SpeakersSamplingEvent", "data": {"speakers":[{"name":"John Doe"}]}}
{"time":37.934, "type":"SpeakersSamplingEvent", "data": {"speakers":[]}}
{"time":38.123, "type":"SpeakersSamplingEvent", "data": {"speakers":[]}}
{"time":38.315, "type":"SpeakersSamplingEvent", "data": {"speakers":[]}}
{"time":41.556, "type":"SpeakersSamplingEvent", "data": {"speakers":[{"name":"John Doe"}]}}
{"time":41.754, "type":"SpeakersSamplingEvent", "data": {"speakers":[{"name":"John Doe"}, {"name":"Janet Foe"}]}}
{"time":42.069, "type":"SpeakersSamplingEvent", "data": {"speakers":[{"name":"Janet Foe"}]}}
{"time":44.823, "type":"SpeakersSamplingEvent", "data": {"speakers":[{"name":"Janet Foe"}]}}
{"time":46.923, "type":"SpeakersSamplingEvent", "data": {"speakers":[{"name":"Janet Foe"}]}}
...

FIG. 3

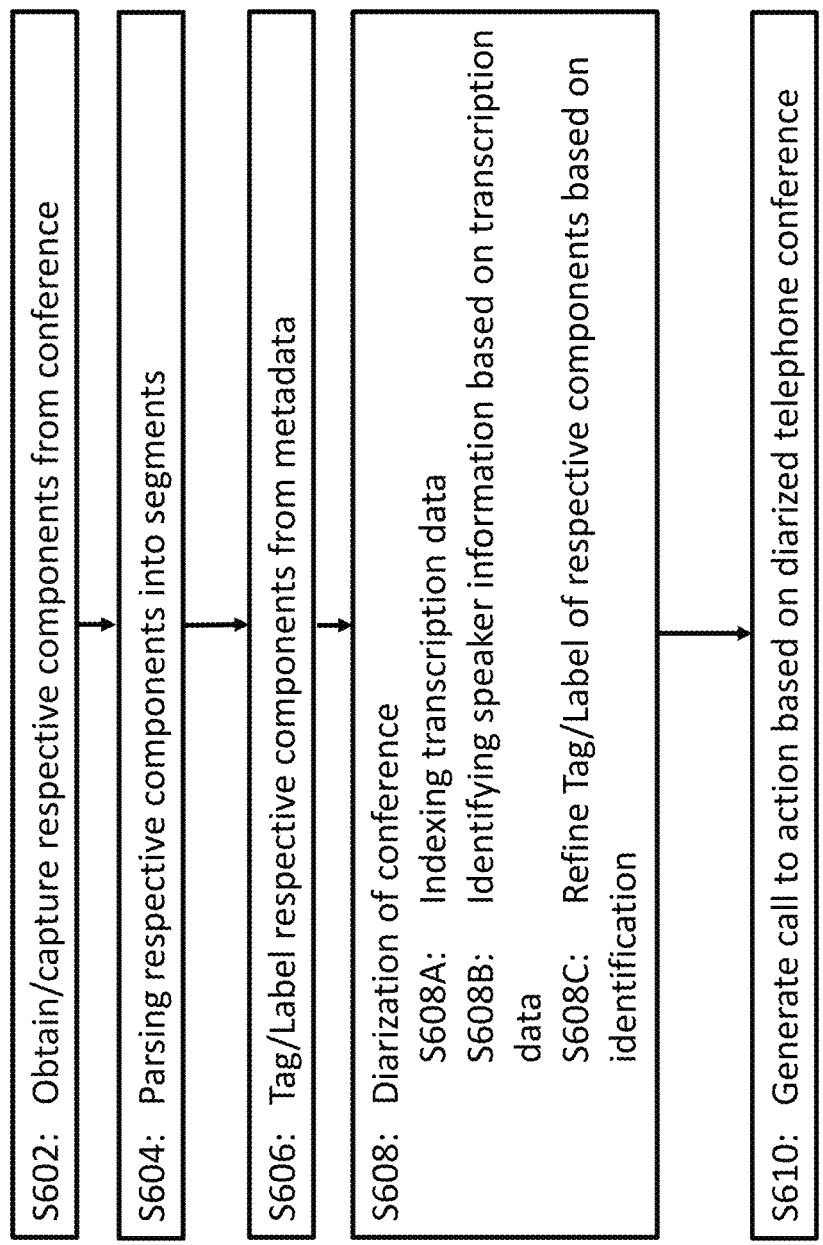

METHOD FOR UNIQUELY IDENTIFYING PARTICIPANTS IN A RECORDED STREAMING TELECONFERENCE

FIELD OF THE INVENTION

The present invention relates generally to methods, apparatus, programmed products and software for speech analysis, and particularly to automated diarization of conversations between multiple speakers.

BACKGROUND

Speaker diarization is the process of partitioning an audio stream containing voice data into time segments according to the identity of the speaker in each segment.

It can be combined with automatic transcription of the audio stream in order to provide a written version of the conversation during a conference, for example.

Speaker diarization is sometimes used in analyzing the sequence of speakers in a video teleconference.

Separating an audio stream into segments, each labeled with the identity of the speaker can be technically challenging in streaming audio (e.g. telephony) and audio-video teleconferences where speaker identification information may be incomplete or obscured. These challenges become more difficult when there are overlaps in speech, very short utterances, muttering, non-speech notices or other audio artifacts. Prior art solutions use coarse data collection as a method of identifying speakers, such as discussed in our prior U.S. patent application Ser. No. 16/297,757, filed on Mar. 11, 2019, and entitled "Metadata-based diarization of teleconferences" and its priority provisional Application No. 62/658,604, filed on Apr. 17, 2018, and entitled "Fine-Grained Diarization of Audio Files using Incomplete Low-Accuracy Pointers" which is incorporated by reference as set if set forth herein.

Diarization of audio recordings or streams and/or audio/visual recordings and/or streams that include conversations between multiple participants presents unique technical challenges. These recordings and streams include speech by multiple parties that may overlap. In addition, in such recordings or streams some participants may speak sparingly such that there is little information by which to identify these speakers while others speak often and may tend to drown out others such that it may be difficult to discern between all speakers. Conventional diarization systems simply are not able to accurately diarize such recordings or streams.

Accordingly, it would be desirable to provide systems, methods, programmed products and software that overcome these and other problems.

SUMMARY OF INVENTION

In view of the above, it is the object of the present disclosure to provide improved systems, methods, programmed products and software to overcome the technological challenges faced in conventional approaches for speech analysis, and particularly to automated diarization of conversations between multiple speakers.

There is therefore provided, in accordance with exemplary embodiments of the invention, a method for uniquely identifying one or more respective participants among a plurality of participants in a first recorded teleconference, the method involving (a) obtaining, by a computer system, components of the first recorded teleconference among the plurality of participants conducted over a network, the components including: (1) an audio component including utterances of respective participants that spoke during the first recorded teleconference, (2) a video component including a video feed as to respective participants that spoke during the first recorded teleconference, (3) teleconference metadata associated with the first recorded teleconference and including a first plurality of timestamp information and respective speaker identification information associated with each respective timestamp information, (4) transcription data associated with the first recorded teleconference, the transcription data being indexed by timestamps, (b) parsing, by the computer system, the audio component into a plurality of speech segments in which one or more participants were speaking during the first recorded teleconference, each respective speech segment being associated with a respective time segment including a start timestamp indicating a first time in the telephone conference when the respective speech segment begins, and a stop timestamp associated with a second time in the telephone conference when the respective speech segment ends, (c) tagging, by the computer system, each respective speech segment with the respective speaker identification information based on the teleconference metadata associated with the respective time segment, and (d) diarizing the first recorded teleconference, by the computer system, in a process including: (1) indexing, by the computer system, the transcription data in accordance with respective speech segments and the respective speaker identification information to generate a segmented transcription data set for the first recorded teleconference, (2) identifying, by the computer system, respective speaker information associated with respective speech segments using a neural network with at least a portion of the segmented transcription data set determined according to the indexing as an input, and a source indication as an output and a training set including transcripts or portions of transcripts tagged with source indication information, and (3) labeling, by the computer system, each respective speech segment based on the identified respective speaker information associated with the respective speech segment.

There is therefore further provided, in accordance with further exemplary embodiments of the invention, a method for uniquely identifying one or more respective participants among a plurality of participants in a first recorded teleconference, the method including: (a) obtaining, by a computer system, components of the first recorded teleconference among the plurality of participants conducted over a network, the components including: (1) an audio component including utterances of respective participants that spoke during the first recorded teleconference, (2) a video component including a video feed as to respective participants that spoke during the first recorded teleconference, (3) teleconference metadata associated with the first recorded teleconference and including a first plurality of timestamp information and respective speaker identification information associated with each respective timestamp information, (4) transcription data associated with the first recorded teleconference, wherein said transcription data is indexed by timestamps, (b) parsing, by the computer system, the audio component into a plurality of speech segments in which one or more participants were speaking during the first recorded teleconference, each respective speech segment being associated with a respective time segment including a start timestamp indicating a first time in the telephone conference when the respective speech segment begins, and a stop timestamp associated with a second time in the telephone conference when the respective speech segment ends, (c) tagging, by the computer system, each respective speech segment with the respective speaker identification information based on the teleconference metadata associated with the respective time segment, and (d) diarizing the first recorded teleconference, by the computer system, in a process including: (1) indexing, by the computer system, the transcription data in accordance with respective speech segments and the respective speaker identification information to generate a segmented transcription data set for the first recorded teleconference, (2) identifying, by the computer system, respective speaker information associated with respective speech segments by: (a) searching through text in at least a portion of the segmented transcription data set determined according to the indexing, so as to determine a set of one or more commonly uttered expressions, (b) determining a source indication based on the set of commonly uttered expressions based on a mapping between the commonly uttered expressions and one or more roles, and (c) identifying the respective speaker information associated with respective speech segments based on the source indication, and (3) labeling, by the computer system, each respective speech segment based on the identified respective speaker information associated with the respective speech segment.

BRIEF DESCRIPTION OF THE DRAWINGS

The above and related objects, features and advantages of the present disclosure will be more fully understood by reference to the following detailed description of the preferred, albeit illustrative, exemplary embodiments of the present invention when taken in conjunction with the accompanying figures, wherein:

FIG. 3 is an example of raw metadata obtained during a recorded teleconference in accordance with exemplary embodiments of the present invention;

FIG. 6 is a flow chart that schematically illustrates another method for refining the segmentation of a conversation, in accordance with embodiments of the present invention;

FIGS. 7B-7I are user interfaces containing bar charts that schematically show additional results of diarization of multiple conversations involving a group of different speakers, in accordance with embodiments of the present invention;

DETAILED DESCRIPTION OF THE EXEMPLARY EMBODIMENTS

The present invention generally relates to improved systems, methods, programmed products and software to overcome the technological challenges faced in conventional approaches for speech analysis, and particularly to automated diarization of conversations between multiple speakers.

In exemplary embodiments, the present invention improves upon prior diarization techniques to identify speakers during a recorded streaming teleconference by utilizing machine learning techniques tied to transcription data of the conversation and training sets with common utterances tagged with speaker information and/or other tagged utterances such as tagged utterance samples.

In exemplary embodiments, the present invention also improves upon prior diarization techniques to identify speakers during a recorded streaming teleconference by utilizing machine learning techniques tied to recognizing, from video data, speaker actions and correlating such speaker actions to transcription data and segmentation information, for example through identification of visual features such as a software-created visual representations that an individual on the call is speaking.

In exemplary embodiments, the present invention further improves upon prior diarization techniques to identify speakers, for example with respect to their particular statements or with respect to who is talking and who is merely making noise, where sound comes from multiple speakers (e.g. through their respective audio feeds).

System Description

Figure 1:
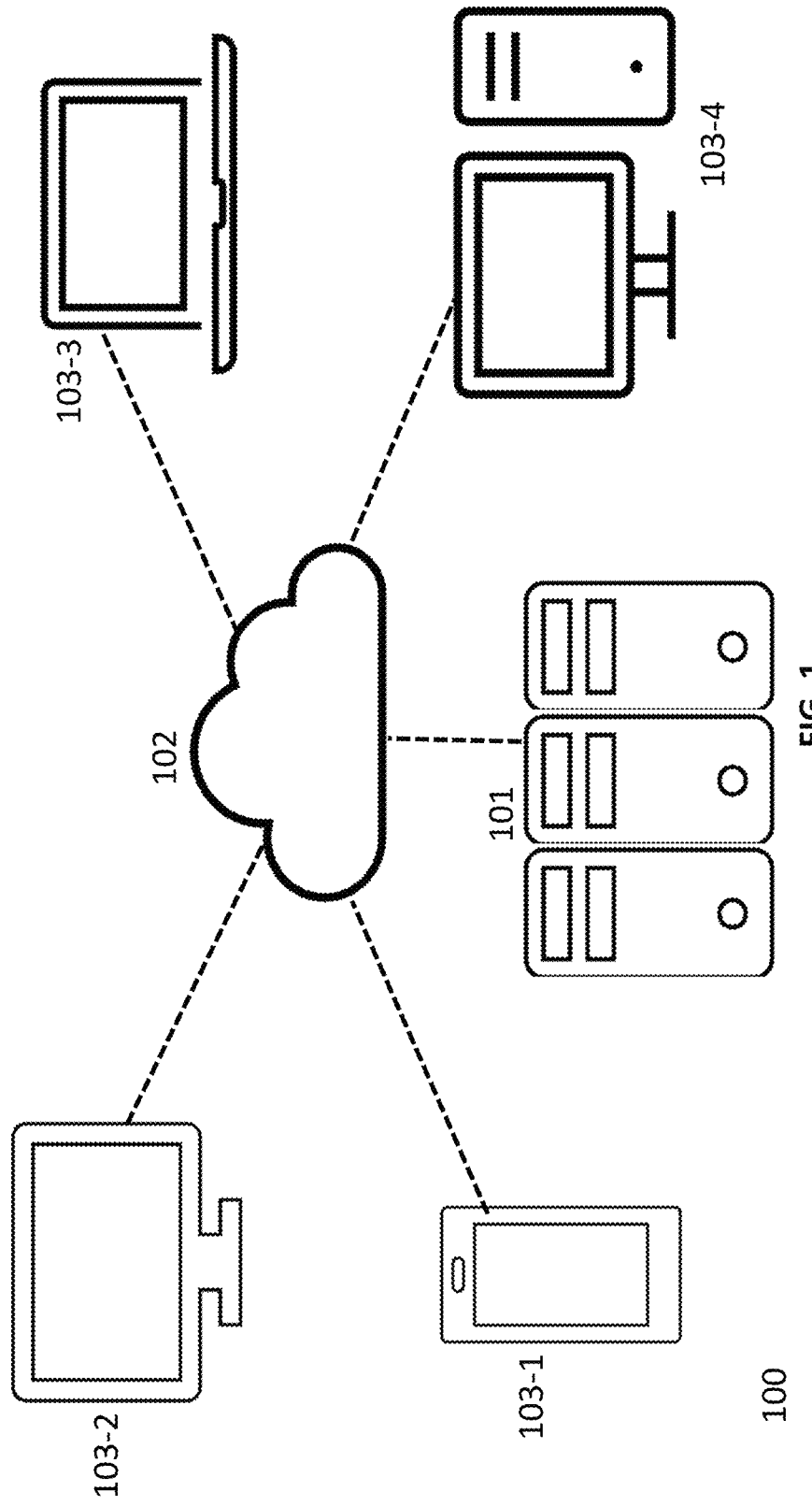
FIG. 1 is a schematic illustration of a system including a plurality of user devices participating in a video conference over the internet in accordance with exemplary embodiments of the present invention.

FIG. 1 is schematic pictorial illustration of a teleconferencing system 100, in accordance with an embodiment of the invention. A computer, such as a server (or group of servers) 101, which may be referred to herein as a computer system, receives and records conversations conducted via a network 102, among pairs or groups of participants using respective computers 103-1, 103-2, 103-3, 103-4. Network 102 may be or include any suitable data communication network, such as the Internet. Computers 103-1, 103-2, 103-3, 103-4, may be any sort of computing devices with a suitable audio interface such as a microphone or other audio input and a speaker or other audio output, video interface such as an on-screen video display or other video output and a camera or other video input, including both desktop and portable devices, such a laptops, tablets and smartphones, to name a few. While four computers 103 are shown, two computers 103 may be used, or three or more computers 103 may be used, or four or more computers 103 may be used.

A data stream among computers 103-1, 103-2, 103-3, 103-4 may be recorded by server 101 includes both an audio stream, containing speech uttered by the participants, and conference metadata. The data stream may further include a video stream, containing visual recordings of the participants. Server 101 may receive audio input from the conversations on-line in real time, or it may, additionally or alternatively, receive recordings made and stored by other means. The conference metadata may have the form of textual code in HTML or another markup language, for example such HTML as used for controlling the teleconference display on the video screens viewed by the participants. The conference metadata may be generated by third-party teleconferencing software, separate from and independent of server 101. As one example, server 101 may capture and collect recordings of web conferences using the methods described in U.S. Pat. No. 9,699,409, whose disclosure is incorporated herein by reference.

Server 101 includes a processor or group of processors, such as a general-purpose computer processor or processors, which is connected to the network 102 by a network interface. Server 101 receives and stores a corpus of recorded conversations in memory operatively connected thereto, for processing by the processor(s). The processor(s) autonomously diarizes the recorded conversations, and may also transcribe the conversations and/or analyze the patterns of speech by the participants. At the conclusion of this process, the processor(s) may present the distribution of the segments of the conversations and the respective labeling of the segments according to the participant speaking in each segment over the duration of the recorded conversations on a display, which display may for example be on a computer 103 or on a different computer or device.

The processor(s) typically carries out the functions that are described herein under the control of program instructions in software. This software may be downloaded to server 101 in electronic form, for example over a network such as network 102. Additionally or alternatively, the software may be provided and/or stored on tangible, non-transitory computer-readable media, such as optical, magnetic, or electronic memory media operatively connected to the server 101.

Figure 2A:
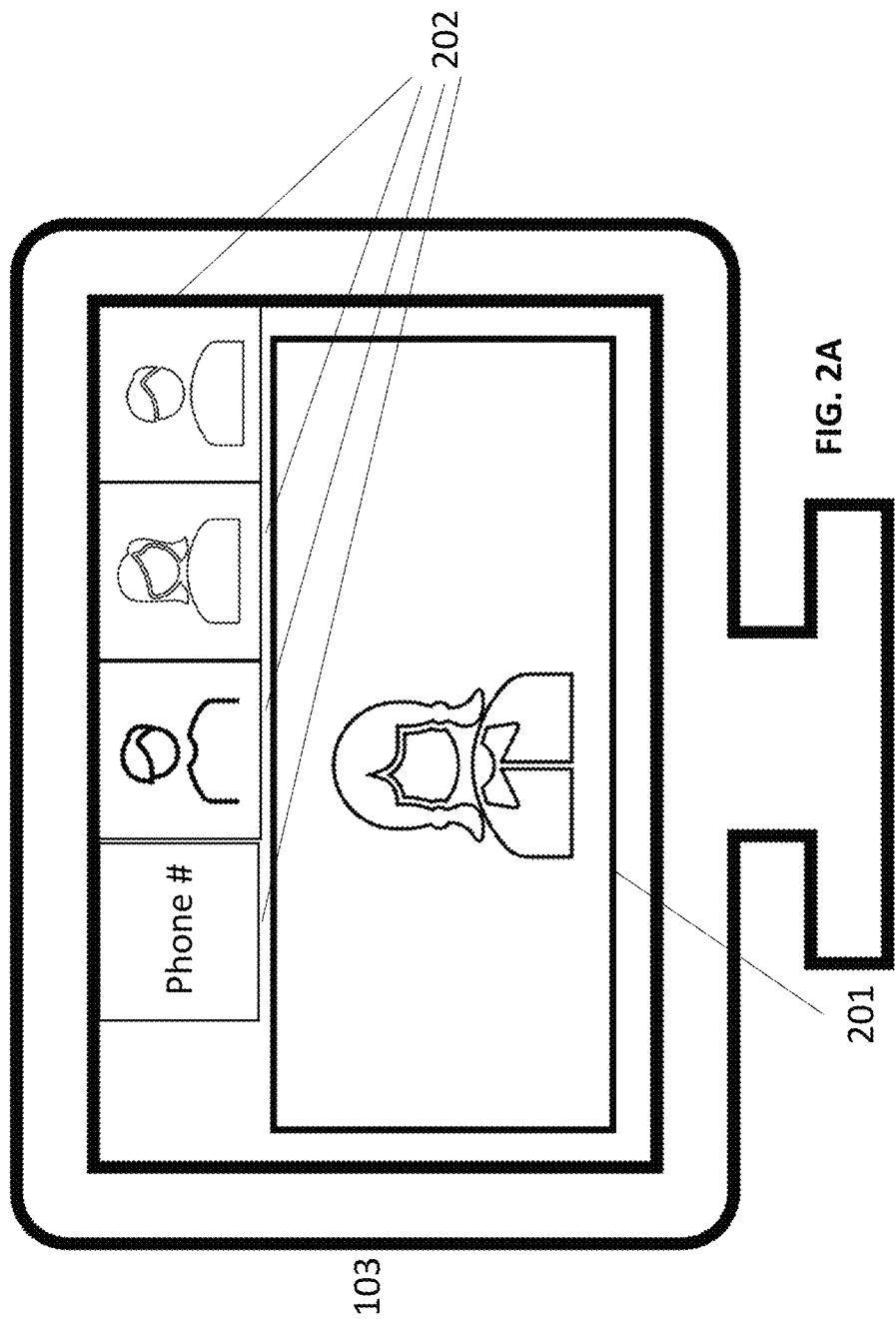
FIGS. 2A-2B are exemplary views of a user device during a video conference over the internet in accordance with exemplary embodiments of the present invention.
Figure 2B:
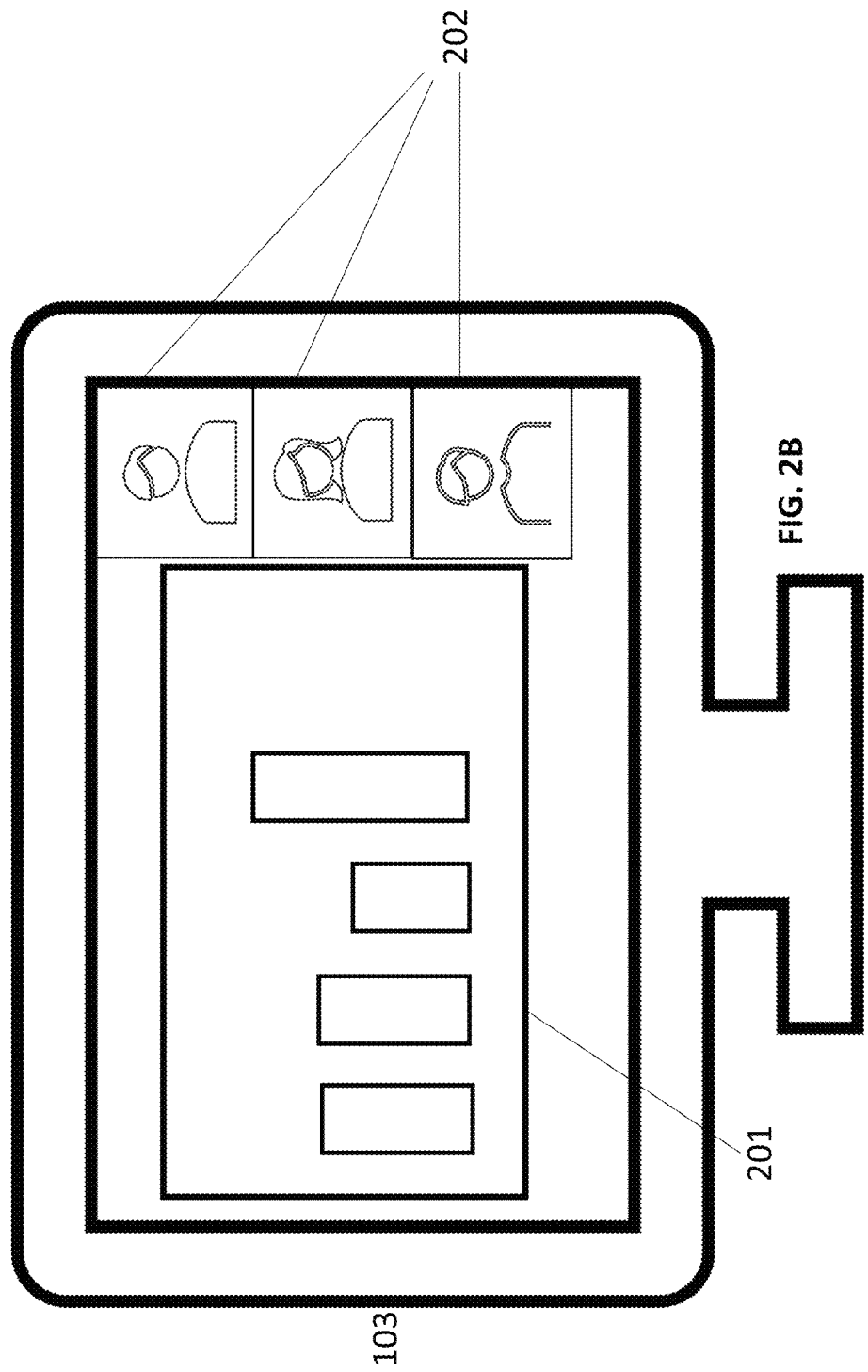

FIGS. 2A-2B are exemplary views of a user device such as a computer 103 during a video conference over the internet in accordance with exemplary embodiments of the present invention. Such computer 103 may have a screen on which may appear a main display area 201 and one or more additional display areas 202. Some of the main display area 201 and additional display areas may display live videos of participants, still photos of participants, and/or other indicia as to participants, such as a name or phone number. Such displays may for example be provided over third-party software, such as ZOOM, TEAMS, WEBEX, to name a few. Various indications may appear on the main display area 201 and additional display areas 202 that indicate that sound is coming from the associated participant, such as a colored rectangle, colored circle, or other colored shape appearing in connection, for example, in spatial association, with the display area 201, 202. It may also be seen that a participant is talking based on their physical appearance within such display area 201, 202 if video is shown. As can be seen in FIG. 2B, main display area 201 may also show a presentation, such as a presentation presented by one of the participants through a "screen-share" function.

Labeling Speech Segments Using Conference Metadata

Figure 5:
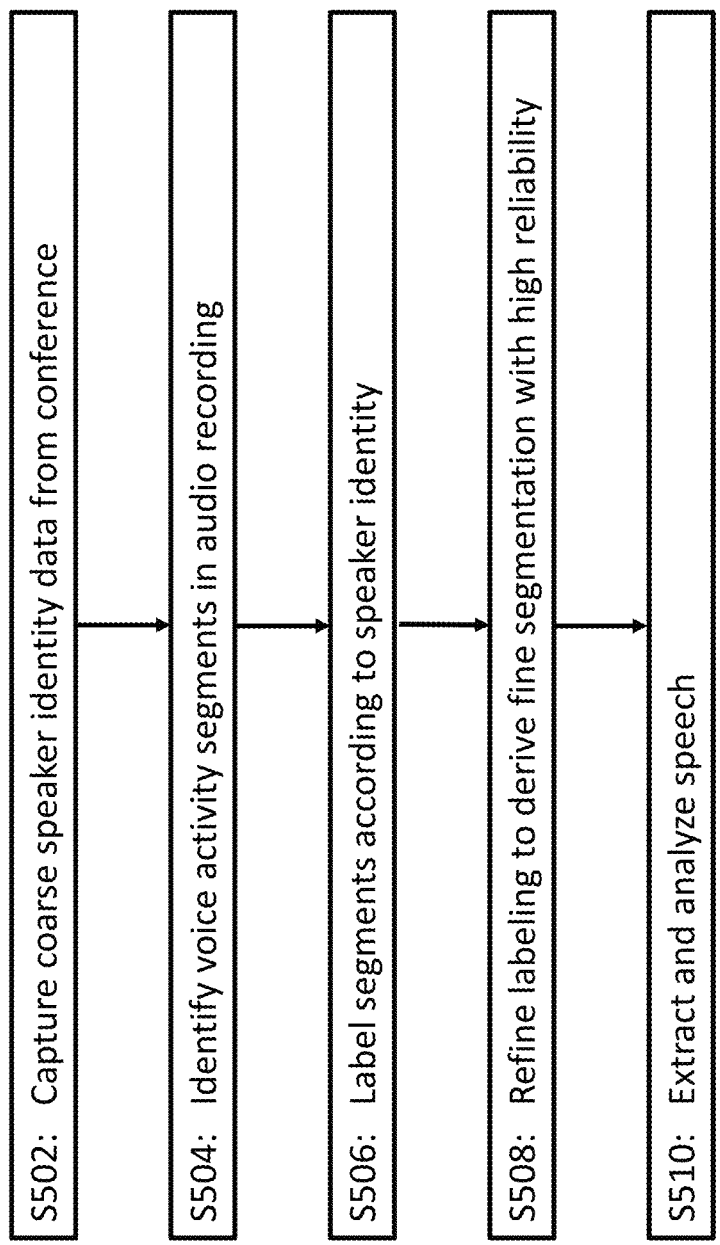
FIG. 5 is a flow chart that schematically illustrates a method for automatic analysis of a conference call based on metadata, in accordance with embodiments of the present invention.

Reference is now made to FIGS. 5 and 3A-D, which schematically illustrate a method for automatic analysis of a conference call, in accordance with an exemplary embodiment of the invention. FIG. 5 is a flow chart showing the steps of a method for coarse identification of speech segments, for example utilizing metadata, while FIGS. 3A-3D are bar plots that illustrate successive stages in segmentation of a conversation. For the sake of concreteness and clarity, the method will be described hereinbelow with reference to the processor(s) of the server 101 and the elements of system 100, and specifically to a teleconference between two participants using respective computers 103-1 and 103-2. The principles of this method, however, may be applied to larger numbers of participants and may be implemented in other sorts of Web or other network-based conferencing systems and computational configurations.

In order to begin the analysis of a conversation, in an exemplary embodiment, the processor(s) of server 101 may capture coarse speaker identity data from the conversation, and may further capture an audio stream containing speech uttered by the participants using respective computers 103-1 and 103-2, at a data capture step S502. The speaker identity data may take the form of metadata, such as HTML, which may be provided by teleconferencing software and may be transmitted over network 102. Various heuristics may be employed, for example by the teleconferencing software, in deciding on one or more speaker identities at any point in, or range in, time, and the actual method that is applied for this purpose is beyond the scope of the present description. The result is that at each of a sequence of points in time during the conversation, the metadata indicates the identity of the participant who is speaking, or may indicate that multiple participants are speaking (along with their respective identities) or that no one is speaking.

To extract the relevant metadata, the processor(s) may, in exemplary embodiments, parse the structure of Web pages' other multi-component data structures, for example which may be transmitted by the teleconferencing application. The processor(s) may then apply identification rules managed within server 101 to determine which parts of the page indicate speaker identification labels. For example, the identification rules may indicate a location of a table in the HTML hierarchy of the page, and classes or identifiers (IDs) of HTML elements may be used to traverse the HTML tree and determine the area of the page containing the speaker identification labels. Additional rules may indicate the location of specific identification labels. For example, if the relevant area of the page is implemented using an HTML table tag, individual speaker identification labels may be implemented using HTML <tr> tags. In such a case, the processor(s) may use the browser interface, for example through a document object model application program interface (DOM API), to locate the elements of interest. Alternatively, if the teleconferencing application is a native application, such as a Microsoft Windows® native application, processor(s) of server 101 may identify the elements in the application using the native API, for example the Windows API.

An extracted metadata stream of this sort, according to an exemplary embodiment, is shown in FIG. 3. Such a metadata stream may be provided, for example, through a teleconferencing service such as ZOOM, TEAMS, WEBEX, to name a few. Information provided in connection with such a metadata stream, for each entry (as illustrated for example as a row in FIG. 3), may include a time, a type indication, and an indication of a particular speaker, multiple speakers, or no speaker as assessed by the provider of the metadata, to name a few. The metadata, in exemplary embodiments, may be taken as samples, for example periodic or aperiodic samples, which may each associated with a timestamp or range of times. The metadata may also be organized into different entries taken when there is a change in state, for example when there is a change in speaker or a change from a speaker to no speaker or vice versa, to name a few. The time, in exemplary embodiments, may be indicated by a timestamp marking the beginning of each new set of speakers, whether that set of speakers may be composed of zero, one, two, or more than two speakers. The metadata may not accurately indicate who is speaking, for example, in the case where one of the participants is logged into the wrong account (such as a family member's account) or if background noise incorrectly indicates that someone is speaking when they are not.

Metadata may take other forms and be accessed in other ways. For example file formats from which textual information may be directly accessed such as an open standard file format, e.g. JSON, may be employed where such metadata is available. As another example, the metadata file may be processed or preprocessed so as to show time ranges associated with various states.

Figure 3A:
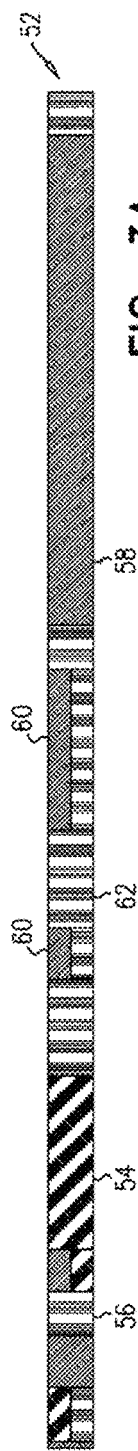
FIGS. 3A-3D are bar plots that schematically illustrate successive stages in segmentation of a conversation, in accordance with exemplary embodiments of the present invention.

The speaker identity metadata may be shown graphically as a bar plot 52 an example of which is shown in FIG. 3A, which may correspond to approximately one minute of a conference. In embodiments, such a bar plot may correspond to a longer or shorter period of time. In the exemplary bar plot 52 of FIG. 3A, movement from left to right reflects passage of time such that the approximately one minute period is covered across the length the bar. In the exemplary bar plot 52, segments 54 and 56 are identified unequivocally in the metadata as belonging to participants which are associated with computers 103-1 and 103-2, respectively, meaning that the teleconferencing software identified the participant associated with computer 103-1 as the speaker during segment 54, and the participant associated with computer 103-2 as the speaker during segment 56. In the exemplary bar plot 52, the teleconferencing software was unable to identify any speaker during a segment 58 (perhaps because both participants were silent), and therefore, no speaker is associated with this segment. Another segment 62 is also identified with the participant associated with computer 103-2, but is interrupted by two uncertain sub-segments 60, in which the metadata indicate that the identity of the speaker is unclear. In embodiments, the identity of the speaker may be unclear because of background noise or because both participants speaking at once, for example.

Figure 3B:
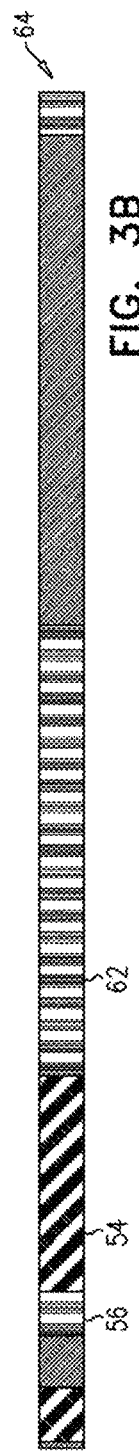

To facilitate labeling of audio segments, in exemplary embodiments the processor(s) may filter the raw metadata received from the conferencing data stream to remove ambiguities and gaps. For example, the processor(s) may merge adjacent speaker labels and close small gaps between labels. FIG. 3B shows an example of the result of applying this process to the segments of FIG. 3A as a bar plot 64.

Figure 4:
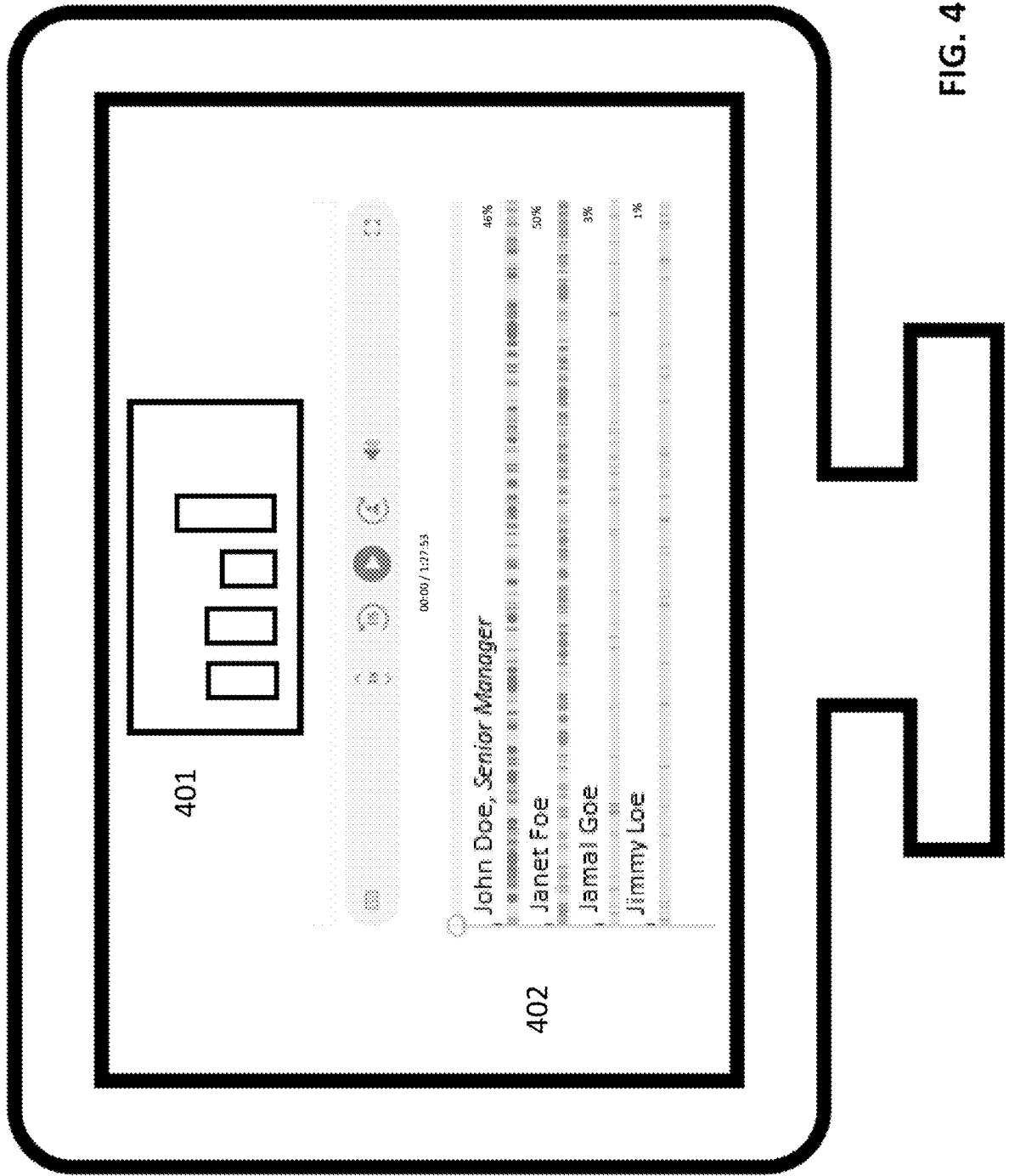
FIG. 4 is an exemplary view of a recorded video conference after diarization in accordance with exemplary embodiments of the present invention.
Figure 4A:
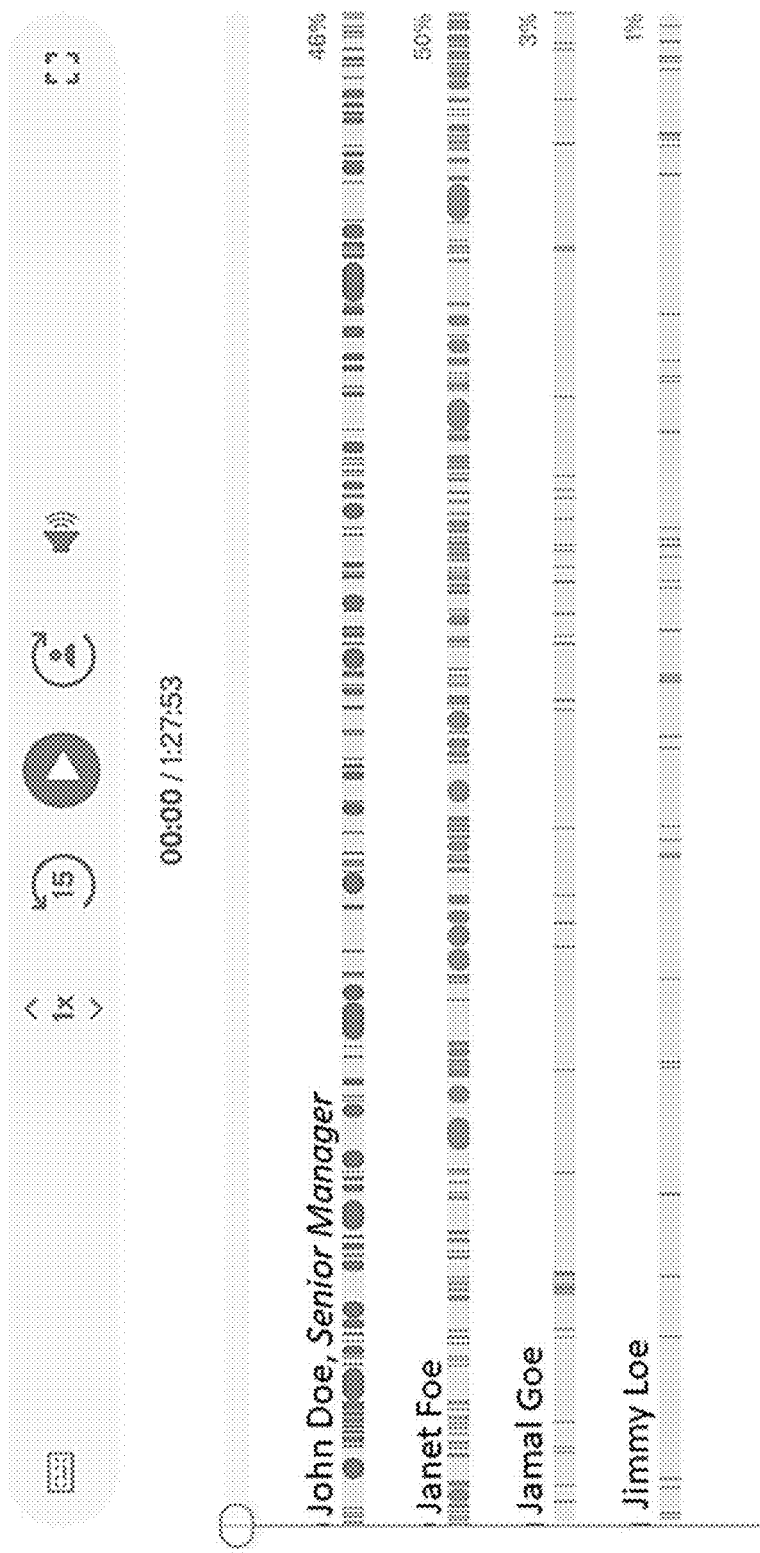
FIG. 4A is a larger view of the diarization of the recorded video in shown in FIG. 4 in accordance with exemplary embodiments of the present invention.

FIG. 4 is an exemplary view of a recorded video conference after diarization in accordance with exemplary embodiments of the present invention. According to embodiments of the present invention, a display of a computer 103 may display a presentation window 401 and a diarization time summary result display 402. FIG. 4A illustrates a close-up for this diarization time summary result display 402. The diarization time summary result display 402 may display names and titles of the participants determined by the system to have spoken based on the determinations made during the diarization process, and an indicator such as a percentage indicating the portion of the call during which the participant is understood to have spoken.

Figure 3C:
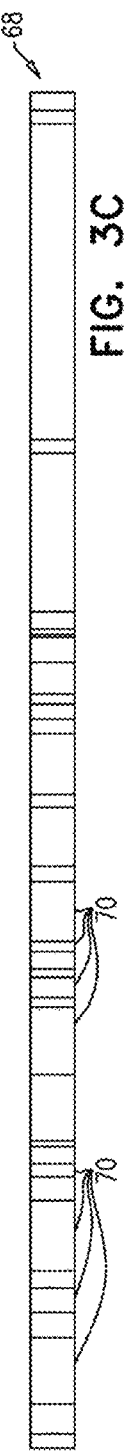

Returning now to FIG. 5, the processor(s) of server 101 may apply a voice activity detector to an audio stream containing speech and identify segments in which one of the participants was speaking, at a voice activity segment identification step S504. In embodiments, the audio stream may be the complete audio stream or a filtered or preprocessed version thereof. For example, the processor(s) of server 101 may identify as speech any segment in the audio stream in which the power of the audio signal exceeded a specified threshold. Alternately or additionally, spectral and/or temporal criteria may be applied in order to distinguish speech segments from other noise. FIG. 3C shows the result of this step as a bar plot 68, containing speech segments 70 interspersed with periods or intervals of silence and/or periods or intervals of nonspeech activity. This step does not typically identify which participant was speaking during each segment 70.

Figure 3D:
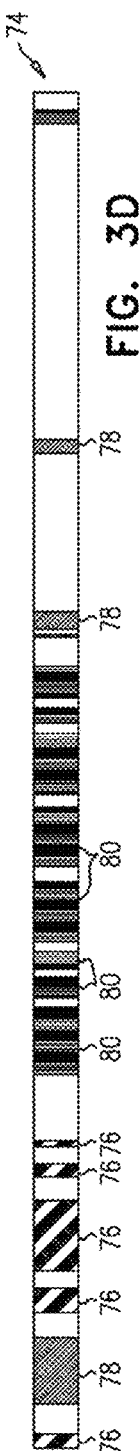

The processor(s) of server 101 may apply the speaker identity data, which may take the form of metadata or filtered metadata, extracted at step S502 to the voice activity segment-related data obtained from step S504 in labeling speech segments 70, at a segment labeling step S506. Speech segments 70 in the audio stream are labeled at step S506 when they can be mapped consistently to exactly one metadata label. FIG. 3D shows the result of this step as a bar plot 74. Segments 76 are now labeled as belonging to participant 30, while segments 80 are labeled as belonging to participant 33. The labeling of segments 78, however, remains ambiguous, because the metadata captured at step S502 did not identify the speakers during these segments. Segments 78 therefore have no speaker labels at this stage.

The bar plots 52, 64, 68, 74 of FIGS. 3A-3D may further include voice activity segments that do not exactly correspond to any particular speaker. Discrepancy between the audio and metadata streams may be caused by a delay in transmission of the audio stream over network 102, relative to timestamps applied in the conference metadata, for example.

To compensate for this discrepancy, the processor(s) of server 101 may estimate the delay in network transmission between the various computers 103-1, 103-2, etc., as well as between these computers and server 101. For this purpose, for example, the processor(s) of server of 101 may transmit and receive test packets over network 102. Additionally or alternatively, the processor(s) may infer the delay by comparing the patterns of segments in bar plots 52, 64, 68, 74. In the present example, the delay is found to be about 1 second, and the processor(s) of server 101 therefore matches voice activity segment 86 to metadata segment 90.

Returning again to FIG. 5, at this point the processor(s) of server 101 will generally have labeled most of the segments of the audio stream, as illustrated by segments 76 and 80 in FIG. 3D. Some segments, however, such as segments 78, may remain unlabeled, for example because the conference metadata did not provide speaker identifications that could be matched to these latter segments unambiguously. Furthermore, short segments in which one of the participants was speaking may have been incorrectly merged at this stage with longer segments that were identified with another speaker, or may have been incorrectly labeled.

To rectify these problems and thus provide finer-grained analysis, the processor(s) of server 101 refines the initial segmentation in order to derive a finer, more reliable segmentation of the audio stream, at a refinement step S508. For this purpose, as noted earlier, the processor(s) of server 101 extracts acoustic features from the speech segments that were labeled at step S506 based on the conference metadata. The processor(s) of server 101 may apply these acoustic features in building a model, which may be optimized to maximize or increase the likelihood that each segment of the conversation will be correctly associated with a single speaker. This model may be used both in labeling the segments that could not be labeled at step S506 (such as segments 78) and in correcting the initial labeling by relabeling, splitting and/or merging the existing segments. Techniques that may be applied in implementing step S508 are described below in greater detail.

Once this refinement of the segment labeling has been completed, the processor(s) of server 101 automatically extracts and analyzes features of the participants' speech during the conference, at an analysis step S510. For example, the processor(s) of server 101 may apply the segmentation in accurately transcribing the conference, so that the full dialog is available in textual form. Additionally or alternatively, the processor(s) of server 101 may analyze the temporal patterns of interaction between the conference participants, without necessarily considering the content of the discussion.

According to exemplary embodiments, labeling or identification of speakers may be based on one or more of a variety of sources of data. For example, according to exemplary embodiments, one or more or all of transcript information relating to a current telephone conference, customer relationship management (CRM) data and historical transcripts of known speakers may be used.

In exemplary embodiments, textual data from transcripts may be used for such identification of speakers, for example according to the role of the speaker. For example, in exemplary embodiments, a seller on a call may be differentiated from a buyer on the call. In exemplary embodiments, this may occur with respect to a two-speaker call, involving a seller and a buyer. In exemplary embodiments, a natural language processing (NLP) model may be used to differentiate relative speaking styles of buyers and sellers. For example, in embodiments, the transcript information, customer relationship management (CRM) data and historical transcripts of known speakers, along with the textual data from the transcripts may be used to generate a training set. In embodiments, the training set may be tagged with labels for each known speaker as a buyer or seller, for example, where transcript portions are known to be associated with buyers or sellers. In embodiments, the training set may be provided to a machine learning algorithm. In embodiments, the training set may be used to train the machine learning algorithm to generate, as an output, an identification of a buyer, for example, based on the transcript information (e.g., a segmented portion of the transcript) for a current telephone conference provided as a data input. For example, the machine learning algorithm may be trained with labeled transcript portions known to be associated with sellers and with labeled transcript portions known to be associated with buyers and such machine learning algorithm may indicate as an output which of two speakers is a buyer and which is a seller. In exemplary embodiments, alternately or in addition, CRM data may be included in the training set to be provided to the machine learning algorithm, for example CRM data indicating identities (e.g. names and/or titles) of individuals on the call. For example, the CRM data used to generate the training set may indicate who was on the call on the seller side and who was on the call on the buyer side. In exemplary embodiments, by determining which speaker is a buyer and which speaker is a seller (for example according to an NLP model) and further looking up the particular identities of the seller and of the buyer in a CRM system, it is possible for the system to provide an initial or final indication of which speaker associated with which portion of the transcript has a particular identity.

The system may selectively use a particular model, algorithm, machine learning algorithm or neural network (and/or specialized training data) associated a particular kind of business involved in the call. For example, one approach may be used where it is determined that a call is associated with a real estate business, and a different approach selectively used where it is determined that the call is associated with a legal matter, and a different approach selectively used where it is determined that the call is associated with a customer support organization. The determination may be made, for example, according to involvement of a particular Internet domain name or business name identified in a CRM system or email associated with the call, combined with a lookup of a business-type code associated with such domain name in an internal or external database (e.g. the North American Industry Classification System (NAICS)). Particular kinds of businesses may also be determined according to a prior or during-call assessment of language employed during the call, for example employing a machine learning algorithm or neural network trained to recognize business types based on such language. In exemplary embodiments, a single or generic model may be employed, along with an input domain vector to effectively differentiate based on the domain or industry.

In exemplary embodiments, text of speakers in a call or stream may be compared against transcripts potentially belonging to one of several known individuals, to determine whether a current speaker may match with one of those known individuals (and accordingly whether the speaker may be labeled accordingly). In exemplary embodiments, a classification model may be used for such purposes. The classification model may look for similarities with respect to particular speech patterns, for example, unusual speech patterns (e.g. mispronunciations, dialects, or usage of specific or unusual phrases, or word counts pertaining to same, to name a few). In exemplary embodiments, a CRM system may be consulted so as to retrieve past transcripts for invitees or participants to the current call or teleconference, so that the comparison may be with respect to such particular known individuals. A machine learning algorithm trained with prior transcripts pertaining to such individuals may be used for the comparison. In exemplary embodiments, a triplet loss approach may be used with respect to the text to more easily apply the approach for identification of new individuals (for example, as as-of-yet unknown individuals) who are not already included in the relevant training data. Advantageously, this may avoid the need for retraining or attempted retraining of the model whenever a new individual is introduced. In other exemplary embodiments, a heuristic approach may be employed for the comparison, for example comparing frequencies of particular unusual words located in the current and the past transcripts so as to ascertain whether a particular known individual is likely to be a match to the current text segments.

In exemplary embodiments, identification of speakers may be employed by a natural language processing model identifying the use of names on a call, alone or in conjunction with additional information. CRM information may additionally be used to retrieve the names or titles of individuals on a call. For example, in exemplary embodiments, a NLP model, performed for example by a machine learning algorithm trained on identification of transcript sections on questions, and trained to identify names, may be used to identify that a transcript portion contains a question and a name. In exemplary embodiments, the system may make the inference that a chronologically adjacent speaker, for example, the speaker who speaks after the question, is answering that question and has that name. In exemplary embodiments, the system may further cross-reference that name against names of the participants on a call (for example, obtained using CRM information), so as to identify that individual as a particular known individual. In exemplary embodiments, the NLP model may identify references to titles of individuals in transcript portions, and may compare such titles to CRM-obtained titles of individuals on a call.

For example, in exemplary embodiments, the system, for example using a machine learning algorithm trained to identify speakers reciting their titles, may compare such titles to CRM-obtained titles of individuals on a call (e.g., "director of sales"), and thereby infer that the speaker is the known individual having that title.

Refinement of Segmentation and Labeling

With reference to FIG. 6, a flow chart is shown schematically illustrating another method for refining the segmentation of a conference, and for generating a call to action based thereon, in accordance with exemplary embodiments of the invention.

At step S602, according to exemplary embodiments of the invention, respective components from or pertaining to a conference, such as a recorded streaming conference conducted over a network 102, may be captured, for example by the processor(s) of the server 101 from computers 103 through the network 102.

According to embodiments of the invention, the respective components may be taken from a recorded streaming conference, or from other forms of telephony, such as recorded telephony. The respective components may include one or more or all of a respective audio component, a respective video component, respective teleconference metadata, and transcription data.

The respective audio component may include words, sounds and other utterances, and background noise associated with, respective participants that spoke during the recorded streaming teleconference, for example a plurality of respective participants making use of various computers 103 such as computers 103-1, 103-2, 103-3, and 103-4. In exemplary embodiments, the respective audio component may be in the form of a single file. This single file may include utterances, and may include other words, sounds or associated background noise, of one or more or all respective participants, for example, the respective participants that spoke during the recorded streaming teleconference. In exemplary embodiments, the respective audio component may be included in a single audio-video file or distributed amongst multiple audio-video files or a combination of audio and audio-video files.

In exemplary embodiments, the respective audio component may include several audio components. One or more or all of these several audio components may be associated with a separate feed during the recorded streaming teleconference. In exemplary embodiments, each separate feed may include an audio, or a combined audio-video, output of a particular sound or sound-and-video obtaining hardware or combination of such hardware, for example a microphone, multi-microphone setup, videocamera, or the like. Such hardware or combination thereof, in exemplary embodiments, may be associated with a computer 103-1, 103-2, 103-3, 103-4 of or used by a participant in the teleconference. In exemplary embodiments, a separate feed may be combined feed relating to sound or combined sound-and-video obtaining hardware for two or more or all of computers 103-1, 103-2, 103-3, 103-4. In exemplary embodiments, a separate feed may be an audio or audio-video file or stream that is sent to server 101 through network 102.

The respective video component may include a video feed of the respective participants, such as the participants who spoke during the conference or certain of the participants who spoke during the recorded streaming teleconference. In exemplary embodiments, the respective video component may be in the form of a single file. This single file may include video of one or more or all of the respective participants, for example, the respective participants that spoke during the recorded streaming teleconference. In exemplary embodiments, the respective video component may be included in a single audio-video file or distributed amongst multiple audio-video files or a combination of video and audio-video files.

In exemplary embodiments, the respective video component may include several video components. One or more or all of these several video components may be associated with a separate feed during the recorded streaming teleconference. In exemplary embodiments, each separate feed may include an video, or a combined audio-video, output of a particular video or sound-and-video obtaining hardware or combination of such hardware, for example a camera, videocamera, multi-camera setup or the like. Such hardware or combination thereof, in exemplary embodiments, may be associated with a computer 103-1, 103-2, 103-3, 103-4 of or used by a participant in the teleconference. In exemplary embodiments, a separate feed may be combined feed relating to video or combined audio-and-video obtaining hardware for two or more or all of computers 103-1, 103-2, 103-3, 103-4. In exemplary embodiments, a separate feed may be a video or audio-video file or stream that is sent to server 101 through network 102. In further exemplary embodiments, one or more or all of these video components may include a still screen identifying a respective participant. The still screen may identify or uniquely identify such respective participant from amongst the several participants, or from amongst those of the several participants who spoke during the recorded streaming teleconference.

In exemplary embodiments, the respective video component may include a streaming video showing one or more or all of the several participants, for example those that spoke during the recording streaming teleconference.

The respective teleconference metadata may be associated with the recorded streaming teleconference. In exemplary embodiments, the teleconference metadata may be indexed, for example according to times associated with the teleconference metadata. The metadata may accordingly be indexed by timestamps, for example by direct application of such timestamps or by application of one or more time periods that may be added to a known starting point in time so as to arrive at a particular associated time period. In embodiments, other forms of electronically associating an event with a time may be used.

In exemplary embodiments, the step of obtaining the respective teleconference metadata may include the metadata being generated by the computer system, e.g., at the processor(s) of the server 101. The generation of the metadata may be accomplished by the computer system, for example according to a mapping. For example, a mapping between a presumed or preliminary identity of one or more of the several participants and one or more of the participants themselves may be established. In embodiments, the teleconference metadata may be generated by the computer system, e.g. at the processor(s) of the server 101, using one or more algorithms configured for such purposes. In embodiments, such algorithm or algorithms may be configured to identify a speaker.

In embodiments, the transcription data may also be associated with the recorded streaming teleconference, and may include, for example, a transcript pertaining to the teleconference. In exemplary embodiments, the transcription data may be indexed by timestamps, for example to provide an indication of what was or is understood to be said at a particular time. Indexing by timestamps may involve direct application of such timestamps or application of one or more time periods that may be added to a known starting point to arrive at a particular time associated with the transcript or a portion thereof. Other forms of electronically associating an event with a time may be used.

In exemplary embodiments, the step of obtaining the transcription data may include the transcription data being generated by the computer system, e.g., at the processor(s) of the server 101.

At step S604, according to exemplary embodiments of the invention, respective components, for example those obtained in step S602, may be parsed into segments, for example by the computer system. For example, one or more respective audio components may be parsed into a plurality of speech segments. These speech segments may be segments in which one or more participants were speaking during the teleconference. Each respective speech segment may be associated with a respective time segment. In exemplary embodiments, this time segment may have a start timestamp associated with the timing in the telephone conference when the segment begins, and may alternately or additionally have a stop timestamp associated with the timing in the telephone conference when the segment ends. Such timestamps may take the form of a direct indication of a time or of an interval or intervals or amount or amounts of time after a fixed reference time. Other forms of electronically associating an event or events with a time or times may be used.

In exemplary embodiments, the parsing step may include maintaining an indication of a relative ordering of chronologically adjacent speech segments from amongst the several speech segments. This relative ordering may be tracked, for example by the processors of the server 101. Such tracking may advantageously allow for determinations, such as labels as are discussed herein, to be made on the basis of such relative ordering.

At step S606, according to exemplary embodiments of the invention, tagging, which may include labeling, of the respective components may occur, for example by the processors of the server 101 and for example using metadata. In exemplary embodiments, one or more or all of the respective speech segments may be tagged or labeled with a respective source feed for the respective audio component. This respective audio component may be the audio component supplied by the respective speech segment. The tagging or labeling, according to exemplary embodiments, may be based on the respective teleconference metadata associated with the respective time segment.

At step S608, which in exemplary embodiments may occur according to a process outlined by substeps S608A, S608B S608C, diarization of the conference may occur, for example by the computer system.

According to exemplary embodiments, at substep S608A, indexing of the transcription data may occur in accordance with one or both of respective speech segments and respective source feeds. As a result of this indexing, a segmented transcription data set for the teleconference may be generated.

Again according to exemplary embodiments, at substep S608B, which may occur after substep S608A, the step of identifying speaker information may be implemented using transcription data. This identification may be performed so as to identify respective speaker information, which may be associated with a respective source feed and/or speech segment. A neural network may be used for this purpose. The neural network may receive, as an input, the segmented transcription data set, or a portion thereof. This portion may be determined according to the indexing. The neural network may produce, as an output, a source indication, for example with respect to the portion of the transcription data set provided to it as the input. The neural network may be trained. In embodiments, training may be provided using a training set. The training set may include, in exemplary embodiments, transcripts tagged or otherwise associated with source indication information. The training set may alternately or additional include commonly uttered terms. The input may further include at least one of the tagged or labeled respective speech segments, and the training set may further include speech segments tagged with source indication information. In exemplary embodiments, only some of the speech segments may be tagged with source identification information, for example one speech segments or more than one of the speech segments. In exemplary embodiments, all of the speech segments may be tagged with source identification information. In exemplary embodiments, the training set may further include data regarding one or more or all of the respective speakers, for example to identify or label them by comparing their activity on the conference with their past activity.

In exemplary embodiments, labeling or parsing may identify all segments pertaining to a single source or speaker. In exemplary embodiments, the parsing may involve a parsing of segments, for example based on audio data or the audio component, and for example according to an as-yet-unidentified participant or speaker in the telephone conference. In exemplary embodiments, the parsing may further involve aggregating all segments relating to a particular (again, for example, as-yet unidentified) speaker or participant. In exemplary embodiments, this again may be performed based on audio data or the audio component. In exemplary embodiments, parsing and identification of particular speakers or classes of speakers may occur based on evaluation of the aggregation of segments. In exemplary embodiments, this may occur based on a model or special-purpose model. In exemplary embodiments, the model may be a classification model. In exemplary embodiments, the model may be an identification of phrases within the aggregated segments known or believed to be associated with a particular speaker or kind of speaker. In exemplary embodiments, the model may be an analysis of associated customer relationship management (CRM) data, such as a role and/or name associated or determined to be associated with the aggregation of segments. In exemplary embodiments, alternatively or in addition to use of associated customer relationship management (CRM) data, analysis in the model may be of information extracted from emails, e.g. emails associated with the call or teleconference. For example, names, titles, or topics may be extracted from the message text and metadata fields (e.g. to, from, cc, and bcc fields, to name a few) and/or attached (e.g. calendar invites, to name one). In exemplary embodiments, the model may involve a combination of models, for example a combination of the above models.

In exemplary embodiments, parsing and labeling may be performed at different times and may be performed based on different components. For example, parsing of segments of a teleconference, may be performed using the audio component, and the parsing may occur based on data associated with the segment. In exemplary embodiments, the parsing may occur using transcript data associated with the segment, so as to identify a speaker (such as a particular speaker or a particular kind or type of speaker). In exemplary embodiments, the identification of the speaker using such associated data may be performed according to a classification model.

In exemplary embodiments, transcript evaluation may be used on its own or may be one of several approaches employed in identifying speakers. In exemplary embodiments, a classifier model may be employed. In exemplary embodiments, such classifier may be used to determine a confidence score (for example that a transcript section is associated with a particular speaker). In exemplary embodiments, this confidence score may be obtained for one, multiple, or all segments. In exemplary embodiments, for example in parallel with such a classifier approach, other data, such as audio data, may be used to determine inferences as to the speaker. In exemplary embodiments, such inferences may be associated with corresponding scores for each of multiple speakers. In exemplary embodiments, different scores or inferences may be combined, for example according to a statistical approach, such as score-averaging. In exemplary embodiments, several kinds of data (e.g., transcript data, CRM data, to name a few) may be used to train a model or machine learning algorithm or neural network, and as inputs provided to such model or machine algorithm or neural network to identify speakers. In exemplary embodiments, such approach may be performed without post-processing of previous or single data-type based models.

In exemplary embodiments, the neural network or networks employed may be a neural networks employing machine learning, an artificial neural network, a deep neural network, a convolutional neural network, a 3d convolutional neural network, a neural network or deep neural network with a convolutional neural network layer, a recurrent neural network, a feedforward neural network, an autoencoder or Diabolo network, a probabilistic neural network, a time delay neural network, a deep stacking network, a tensor deep stacking network, a regulatory feedback network, a radial basis function network, a general regression neural network, a deep belief network, a recurrent neural network, a fully recurrent neural network, a Boltzmann machine, a self-organizing map, a learning vector quantization, a simple recurrent network, reservoir computing, an echo state network, a bi-directional recurrent neural network, a hierarchical recurrent neural network, a stochastic neural network, a modular neural network, a committee of machines, an associative neural network, a physical neural network, an instantaneously trained neural network, a spiking neural network, a neocognitron, a compound hierarchical-deep model-composed deep network, a deep predictive coding network, a multilayer kernel machine, a dynamic neural network, a cascade correlation-based network, a neuro-fuzzy network, a compositional pattern-producing network, a one-shot associative memory network, a neural Turing machine, a pointer network, and/or an encoder-decoder network. The neural network may have a transformer architecture, and may include an attention mechanism.

In exemplary embodiments, using such neural networks, one or more operations of a variety of operations may be used to determine a classification of an individual, and therefore to label there utterances based thereon, for example, whether the individual is a salesperson as opposed to a customer. In exemplary embodiments, a neural network or set of neural networks may accordingly be trained to recognize aspects of such classifications. In other exemplary embodiments, the determination may be made by the processor(s) of the server 101 using other non-neural network software.

In exemplary embodiments, the classification may be performed according to the transcription data. For example, frequent use of a sales company name may tend to indicate the speaking participant is salesperson associated with that company while frequent use of a customer company name may tend to indicate the speaking participant is a customer associated with that company. Use of names of persons may likewise be used, for example, based on the assumption that a person will only infrequently use their own name in a conversation, but those who speak before or after them may be very likely to use their name. The neural network may also be trained by tagging, in training set, data with associated formal names to recognize variant names such as nicknames, to accurately recognize when a participant's name may be being used, or assumptions may be made where there are relatively small differences when the actual and in-use names are expressed in written or spoken form, the names may be considered the same. In exemplary embodiments, comparisons may be made with respect to names of meeting participants obtained from additional sources, for example, from an electronic calendar or email meeting invitation(s) for the teleconference. Advantageously, such textual analysis can be performed even in the absence of visual indications of identity. Neural networks may be trained with respect to transcripts of individuals making statements and tagged with their position or role (e.g. customer or salesperson, high-ranking or low-ranking employee, etc.), and accordingly by providing a transcript, such as a full transcript with identification of which statements are made by an individual participant, as an input to such neural network, the neural network can provide a determination as to that person's position or role. The neural network may also or alternately be trained based on more focused training set data, such as the occurrence of certain commonly uttered terms which may be associated with particular roles (e.g. "how much does it cost" which tends to indicate a buyer).

Such determination in exemplary embodiments, may be made based on language choices as well as, or alternately based on, cadence choices such as whether the participant speaks in long uninterrupted segments (which may for example be indicative of a salesperson), which participant spoke more towards the beginning of the conversation, and which participant spoke more towards the end of the conversation, for example during the last five minutes. In exemplary embodiments, the relative ordering of chronologically adjacent speech segments from amongst the plurality of speech segments, may be used in order to make such cadence or speech-pattern based classification determinations. In exemplary embodiments, the total talk time associated with a particular participant may also be used to apply a classification to him or her, for example based on an assumption that a salesperson will tend to speak more than a customer.

In exemplary embodiments, references within transcript segments may be used, alternatively or in combination with other techniques discussed herein, to identify a speaker of the segment in which the reference occurs or a chronologically nearby segment, which identification, as discussed herein, may be used in the diarization of the transcript.

Figure 8:
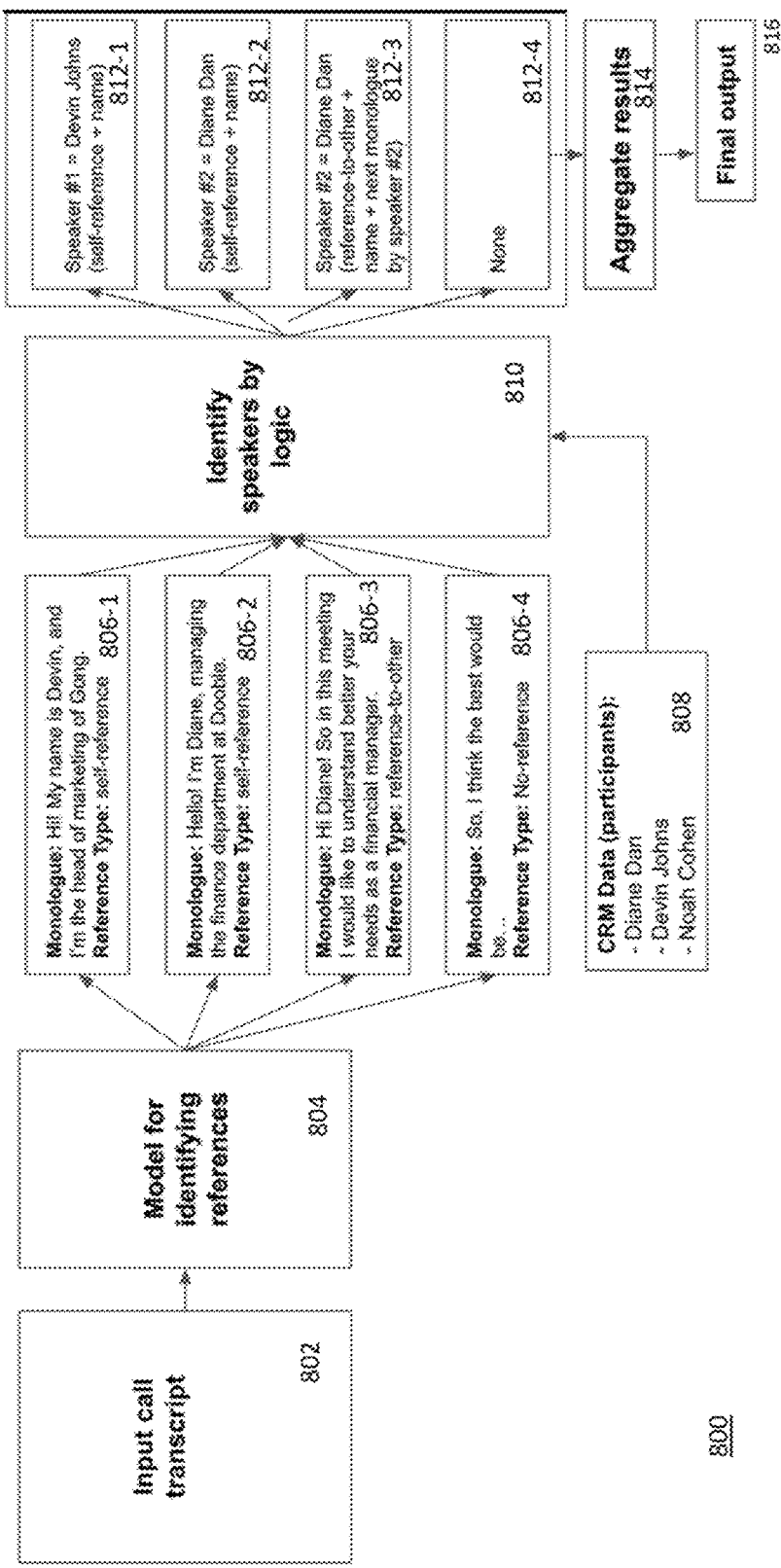
FIG. 8 is a flow chart showing a process for identifying references and identifying speakers based thereon, according to exemplary embodiments.

In exemplary embodiments, which may be understood for example with respect to the process 800 of FIG. 8, an input call transcript 802 may be used, and supplied to a model for identifying references 804. In exemplary embodiments, the input may take the form of transcript segments associated with one or more initial assessments of speakers, which may be, for example, placeholder or pseudonymous speakers derived from metadata as discussed for example in connection with step S606 of FIG. 6.

For purposes of illustration, according to an exemplary embodiment an example of a beginning of such transcript, with associations where the associated persons are not yet known at the time of input, may be as follows:

Speaker #1: Hi! My name is Devin, and I'm the head of marketing of Gong.

Speaker #2: Hello! I'm Diane, managing the finance department at Doobie.

Speaker #1: Hi Diane! So in this meeting I would like to understand better your needs as a financial manager.

Speaker #2: So, I think the best would be to cut costs down.

Speaker #3: [ . . . ]

In exemplary embodiments, a model for identifying references 804 may, based on input call transcript 802 (e.g. that shown above) identify reference types 806-1, 806-2, 806-3, 806-4 corresponding to the segments of the input. For example, segments (e.g. the first and second segments, respectively) may be determined to be self-references, with respect to a name (e.g. "Devin" or "Diane") and/or a title or role, (e.g. "head of marketing of Gong" or "managing the finance department at Doobie"). In exemplary embodiments, references-to-others may be identified by the model for identifying references 804 at particular segments (e.g. the third segment), for example with respect to name (e.g. "Diane") and/or title or role ("financial manager"). In exemplary embodiments, the model for identifying references may identify no-references (that is, the lack of a reference) at particular segment(s) (e.g., the fourth segment).

In exemplary embodiments, at step 810, speakers may be identified by logic. In exemplary embodiments, this process may accept as inputs these segment-associated references 806-1, 806-2, 806-3, 806-4 and indications of actual or potential participants on a call or conference 808 (e.g., by name or by title, and e.g. as obtained from CRM data or calendar invites as or the like, and as corresponding for example, to the names "Diane Dan", "Devin Johns," and "Noah Cohen" in this example). In exemplary embodiments, other or additional references may be employed, for example, a plural collective first person reference, (e.g. "we"), and/or a plural second person reference, (e.g. "both of you"), or third person references, (e.g. "that last speaker" or "those past couple speakers") to name a few.

The identification of speakers by logic 810 may involve forming a plurality of inferences 812-1, 812-2, 812-3, 812-4, based on such inputs. For example, based on a reference (e.g., 806-1, a self-reference to "Devin") and a comparison with the list of potential participants 808, it may be inferred at 812-1 that a speaker (e.g. Speaker #1 which is the pseudonym for the speaker of the first segment) is a particular person (e.g., "Devin Johns"). As an additional example, based on a reference (e.g., 806-2, a self-reference to "Diane") and a comparison with the list of potential participants 808, it may be inferred at 812-2 that a speaker (e.g. Speaker #2 which is the pseudonym for the second speaker) is a particular person (e.g., "Diane Dan"). As an additional example, based on a reference (e.g., 806-3, a reference-to-other to "Diane" as the following speaker) and a comparison with the list of potential participants 808, it may be inferred at 812-3 that a speaker (e.g. Speaker #2, the pseudonym for the fourth segment) is a particular person (e.g., "Diane Dan"). Where there is a no-reference (e.g., 806-4), a null inference (e.g. 812-4) may be made.

In exemplary embodiments, the inferences may be generated by determining a reference in a statement or segment, and then searching for the name of the referenced speaker, or his or her title or role, and comparing same to a trusted source such as CRM data or a calendar. In exemplary embodiments, additionally or in the alternative, a Named Entity Recognition (NER) may be employed for inference generation and speaker identification. In exemplary embodiments, it may be determined that there is a reference-to-other and a question, and it may be inferred by the system that the speaker who answered the question (e.g., the speaker that follows after the question segment) is the one to whom the question was directed.

In exemplary embodiments, a certainty level may also be associated with an inference, for example, in the form of a percentage or a probability from 0 to 1. For example, an inference formed with reference to a name may be assumed to have a relatively higher certainty level than an inference formed with respect to a title, and a self-reference-formed inference may be assumed to have a higher certainty than a reference-to-other-formed inference.

In exemplary embodiments, the inferences may be aggregated at step 814 into a combined assessment of which segments may be associated with which speakers, and these results may be output, for example as a final output 816. The aggregation may determine the identity of particular pseudonymous speakers according to a tiebreaking mechanism, for example, where inferences may be conflicting. Such tiebreaking mechanisms may include a majority or plurality vote with respect to the identify of each pseudonymous speaker (or each which is in dispute), or using a weighted average of the confidences associated with the inferences as to a particular pseudonymous speaker.

The final output 816, in exemplary embodiments, may be an association of one or more or all of the pseudonymous speakers with a particular identity. By way of example, in exemplary embodiments, the final output 816 in the example discussed in connection with FIG. 8 may be:

Speaker #1: Devin Johns

Speaker #2: Diane Dan

Speaker #3: Noah Cohen

In exemplary embodiments, the final output 816 may be associated with a confidence indication, for further evaluation by additional inference mechanisms and/or for review by the user, advantageously providing an indication that the user should take caution should the inferences not be assessed to be particularly strong.

Figure 9:
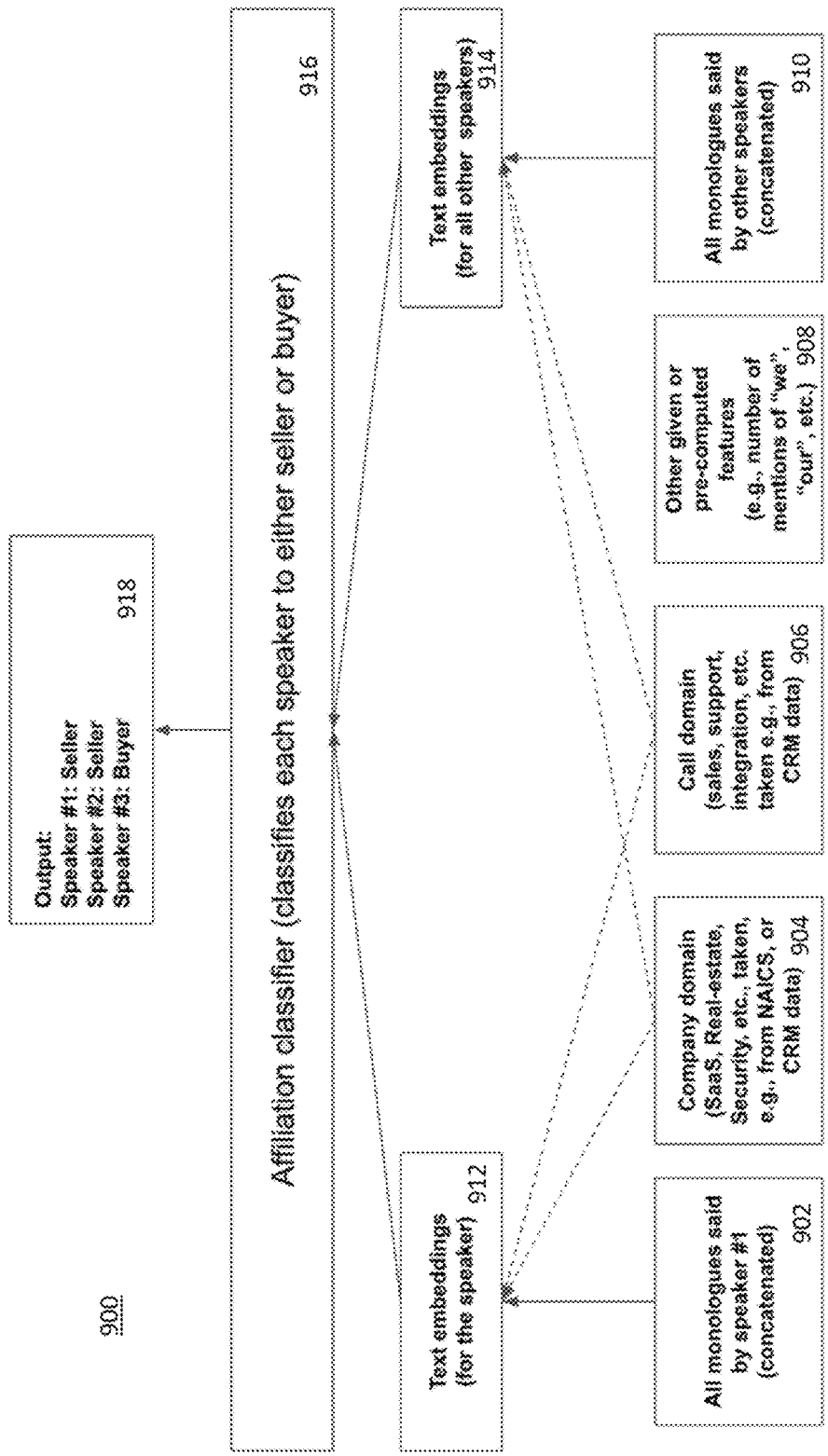
FIG. 9 is a flow chart showing a process for identification of speakers as buyers or sellers, according to exemplary embodiments.

FIG. 9 is a flow chart showing a process 900 for identification of speakers as buyers or sellers, according to exemplary embodiments.

According to exemplary embodiments, text embeddings for the a given speaker 912 (identified, e.g. pseudonymously in this example as speaker #1) and text embeddings for one or more other speakers 914, are built based on inputs including monologues of the speaker 902 and monologues of other speakers 910, respectively, which may be in a concatenated format. The inputs may also include, for the text embeddings, one or more or all of (1) a participant industry domain 904, such as company domain or type (examples including software-as-a-service, real estate, security, to name a few, which may be obtained for example by a lookup to NAICS or CRM database, to name a few), (2) a call domain, 906 such as a call purpose domain (e.g. sales, support, integration, to name a few, which may be obtained for example from data stored in a CRM database), and/or (3) other given or pre-computed features 908 (e.g., a number of mentions of predetermined key-words such as "we", "our", "etc." which may be known to be indicative of a buyer or seller persona, to name a few).

In exemplary embodiments, the text embeddings for the speaker 912 and the text embeddings for the one or more other speakers 914 may contain an embedding element or elements that output a vector representing those portions of the input text that relate to speaker affiliation as buyer or seller, which vectors are classified according to affiliation classifier 916 as a buyer or seller, for example absolutely or in the form of a confidences (e.g., a probability). Such results may be aggregated for each speaker, for example according to a majority vote or statistical calculation based on various confidences, into an output 918 of whether each speaker is a buyer or a seller. In exemplary embodiments, such outputs may be indicated absolutely or as a confidence or probability calculated based on the foregoing, advantageously flagging to a user or for further evaluation a relatively weaker or relatively stronger determination. It will be understood that such process as used in 900 is shown with respect to buyer/seller classification, but that such approach may be used for other classifications without departing from the spirit of the invention.

In exemplary embodiments, after speakers are identified as buyers or sellers, for example in a two-party call involving a buyer and a seller, CRM data or calendar invite data, to name a few, may be consulted so as to identify the buyer and/or the seller as a particular, named speaker.

In exemplary embodiments, cadence or speech-pattern based information may be used in combination with textual analysis, for example by a neural network trained with both kinds of information with appropriate tags, to come to an appropriate classification.

In exemplary embodiments, the various rules or heuristics discussed herein may be explicitly suggested to a neural network via manually created training set data classifying based on certain behavior, or the neural network may simply be trained, for example using a machine learning algorithm, based on speech patterns of individuals with known classifications, advantageously avoiding such a relatively manual and potentially biased training process.

In exemplary embodiments, the various rules or heuristics discussed herein may be used for identification of particular individuals. For example, a neural network may be trained on training set data tagged with whether or not a speaker is a particular individual, and may thereby be used to determine whether future text and speech and cadence patterns can be labeled with that person.

According to exemplary embodiments, at substep S608C, which may occur after substep S608B, refining or labeling of the respective components occurs, for example, based on the identification. In exemplary embodiments, each respective segment from the same source feed may be labeled. This labeling may be based on one or both of the teleconference metadata and identified respective speaker information, such as may be associated with the respective source feed and/or speech segment.

Use of Diarization Results in Coaching Salespeople

In some embodiments of the present invention, server 101 diarizes a large body of calls made by salespeople in a given organization, and outputs the results to a sales manager and/or to the salespeople themselves as an aid in improving their conference behavior. For example, server 101 may measure and output the following parameters, which measure relative durations and timing of speech by the participants (in this case, the salesperson and/or the customer) in each call:

- Talk time: What percentage of the conversation is taken up by speech of each participant, or by no one speaking. Such parameter may be selectively measured and/or outputted only for salespeople.
- Longest monologue: How long does the participant, speak without pausing, for example for more than a predetermined interval of time, or for example until another speaker replaces the participant in the conversation and/or provides interjections determined to be adequately substantive, for example to provide feedback the participant. For example, the processor(s) of server 101 may measure the longest segment of continuous speech, allowing for only non-informative interruptions by the customer (such as "a-ha") to avoid a determination that the monologue has ended, and/or allowing for only longer phrases, such as longer phrases having other than standard utterances (e.g. a longer phrase with substantive content like "That is interesting, but I want to know more about pricing"), to end the monologue. Such parameter may be selectively measured and/or outputted only for salespeople.
- Longest customer story: A good salespeople is expected to be able to ask customers open-ended questions. Therefore, the processor(s) of server 101 may measure the longest "story" by a participant, i.e., the longest continuous speech by the participant, allowing for only short interruptions by the salesperson (typically up to 5 sec). Such parameter may be selectively measured and/or outputted only for the customer, which may for example be assumed to be all participants other than those determined to be salespeople.
- Interactivity: When selling a product of a particular complexity, there may be advantages to employing certain rates as to how often the call goes back and forth between the parties. This parameter can be assigned a score, for example on a scale of 0 to 10. The score might represent how closely this parameter matches a preferred rate, or simply provide a qualitative indication of how often the change in speakers before. This parameter can be assigned other measures, such as changes in speaker per minute, which might for example range between 0 and 30 speaker changes per minute.
- Patience: How long does the salesperson wait before regaining the conversation after the customer speaks. In other words, does the salesperson wait to ensure that the customer has completed a question or statement, or does the salesperson respond quickly to what might be an incomplete statement? This might be measured for example in terms of the average amount of silence between intervals in which customers are speaking and intervals in which salespeople are speaking. In order to determine this parameter, the system may keep track of which participants are salespeople, and which participants are customers.

Figure 7A:
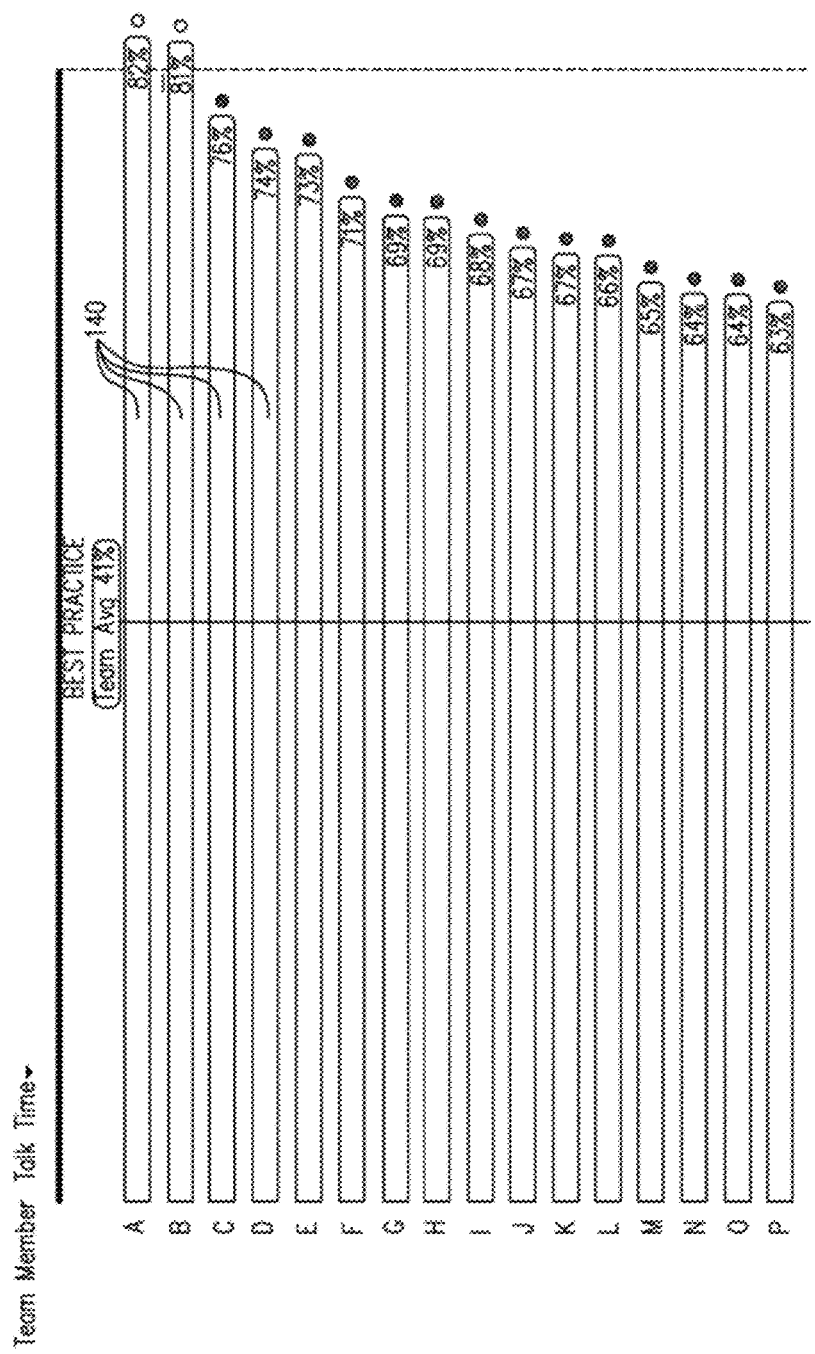
FIG. 7A is a bar chart that schematically shows results of diarization of multiple conversations involving a group of different speakers, in accordance with embodiments of the present invention.

FIG. 7A is a bar chart that schematically shows results of diarization of multiple conversations involving a group of different speakers, for example salespeople in an organization, in accordance with an exemplary embodiment of the invention. Each bar 140 shows the relative "talk time" of a respective salesperson, labeled "A" through "P" at the left side of the chart. Such a bar chart may be generated and displayed as a call to action according to exemplary embodiments of the invention. Due to the increased accuracy of the diarization as a result of the improved diarization systems and methodologies herein, the talk time, for example, a portion of the overall call spent talking between a particular seller A-P, may advantageously be computed with a high level of accuracy, such as sufficient to draw fine distinctions between good sales practices by such sellers and poor sales practices that are not in line with best practices. In embodiments, a best practice with which the accurate results may moreover be indicated, for example, with a dotted line as shown in FIG. 7A.

FIGS. 7B-7I are exemplary user interfaces containing bar charts that schematically show additional results of diarization of multiple conversations involving a group of different speakers, (labeled "A" through "J" or, in the case of FIG. 7H "A" through "L" and in the case of FIG. 7I, "A" through "N") in accordance with embodiments of the present invention. Such interfaces and/or bar charts may be generated and displayed as calls to action according to exemplary embodiments of the invention, and may be indexed by appropriate tabs.

Figure 7B:

In FIG. 7B, a talk ratio is shown for various participants or members of a sales or other team, which may include a calculated average for the participants, group or team, as well as an indication of a best practice figure, and tooltips with recommendations. Information of particular value, such as the team average, may be prominently displayed at the tab itself. Due to the increased accuracy of the diarization as a result of the improved diarization systems and methodologies herein, the talk ratio, for example, a ratio of time spent talking between a particular seller A-J and a buyer on the call, may advantageously be computed with a high level of accuracy, such as sufficient to draw fine distinctions between good sales practices by such sellers and poor sales practices that are not in line with best practices. Given that such distinctions may be important to retention, promotion, and coaching decisions, such accuracy is the ultimate determination and the diarization data upon which it is based may be of great importance.

Figure 7C:
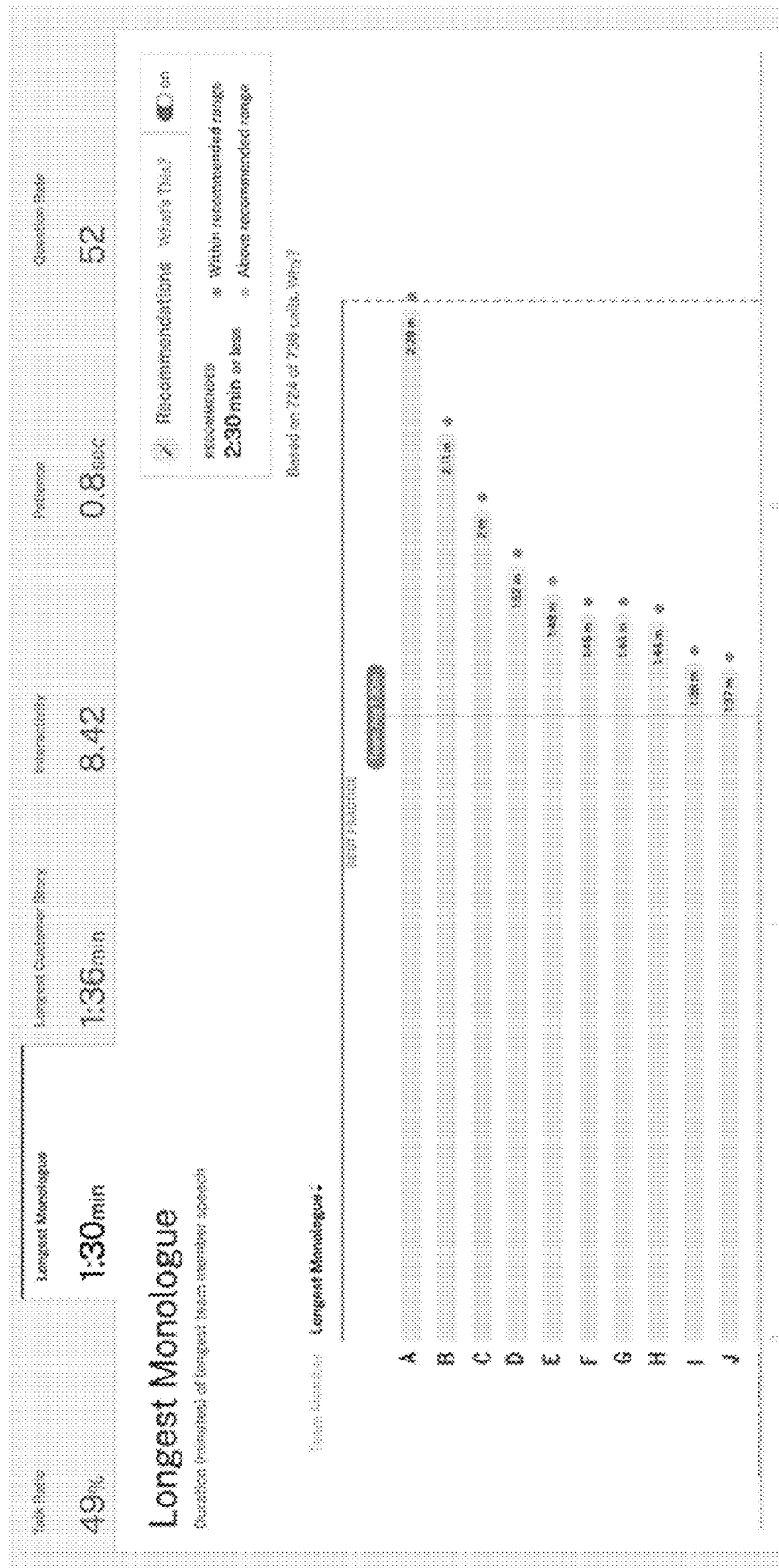

In FIG. 7C, a longest monologue is shown, indicating for example, a longest uninterrupted speech segment belonging to each individual. Due to the increased accuracy of the diarization as a result of the improved diarization systems and methodologies herein, the longest monologue, for example, a longest amount of time spent talking without interruption by a particular seller A-J on the call, may advantageously be computed with a high level of accuracy, and with a high degree of confidence that the longest monologue was not in fact by another speaker on the call, which fact would completely undermine the determination of the longest monologue. Such accurate longest monologue time is sufficient to draw fine distinctions between good sales practices by such sellers and poor sales practices that are not in line with best practices, for example with a best practice being indicated with a dotted line as shown towards the right of FIG. 7C. Given that such distinctions may be important to retention, promotion, and coaching decisions, such accuracy in the ultimate determination and the diarization data upon which it is based may be of great importance.

Figure 7D:
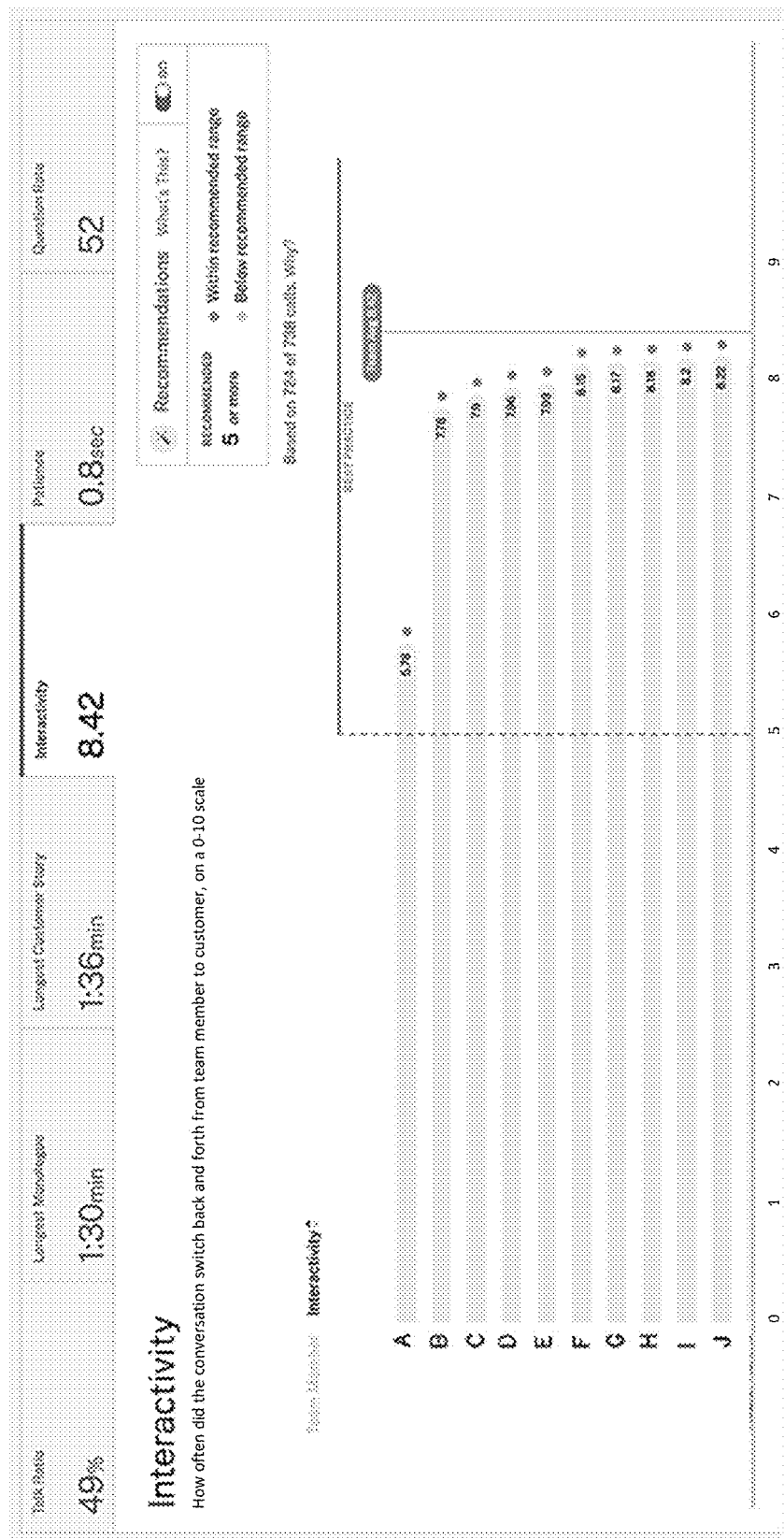

In FIG. 7D, an indication of interactivity is provided for each individual, for example being a measure (e.g. on a 0-10 scale) of how quickly or often that individuals' corresponding speech segments changed over to speech segments of other individuals on the call. Due to the increased accuracy of the diarization as a result of the improved diarization systems and methodologies herein, the interactivity by a particular seller A-J on the call, may advantageously be computed with a high level of accuracy, and with a high degree of confidence that determined changes in speakers (for example, from the particular seller A-J and a customer) are accurately determined. Such interactivity measure is sufficient to draw fine distinctions between good sales practices by such sellers and poor sales practices that are not in line with best practices, for example with a best practice being indicated with a dotted line as shown towards the center of FIG. 7D. Given that such distinctions may be important to retention, promotion, and coaching decisions, such accuracy in the ultimate determination and the diarization data upon which it is based may be of great importance.

Figure 7E:
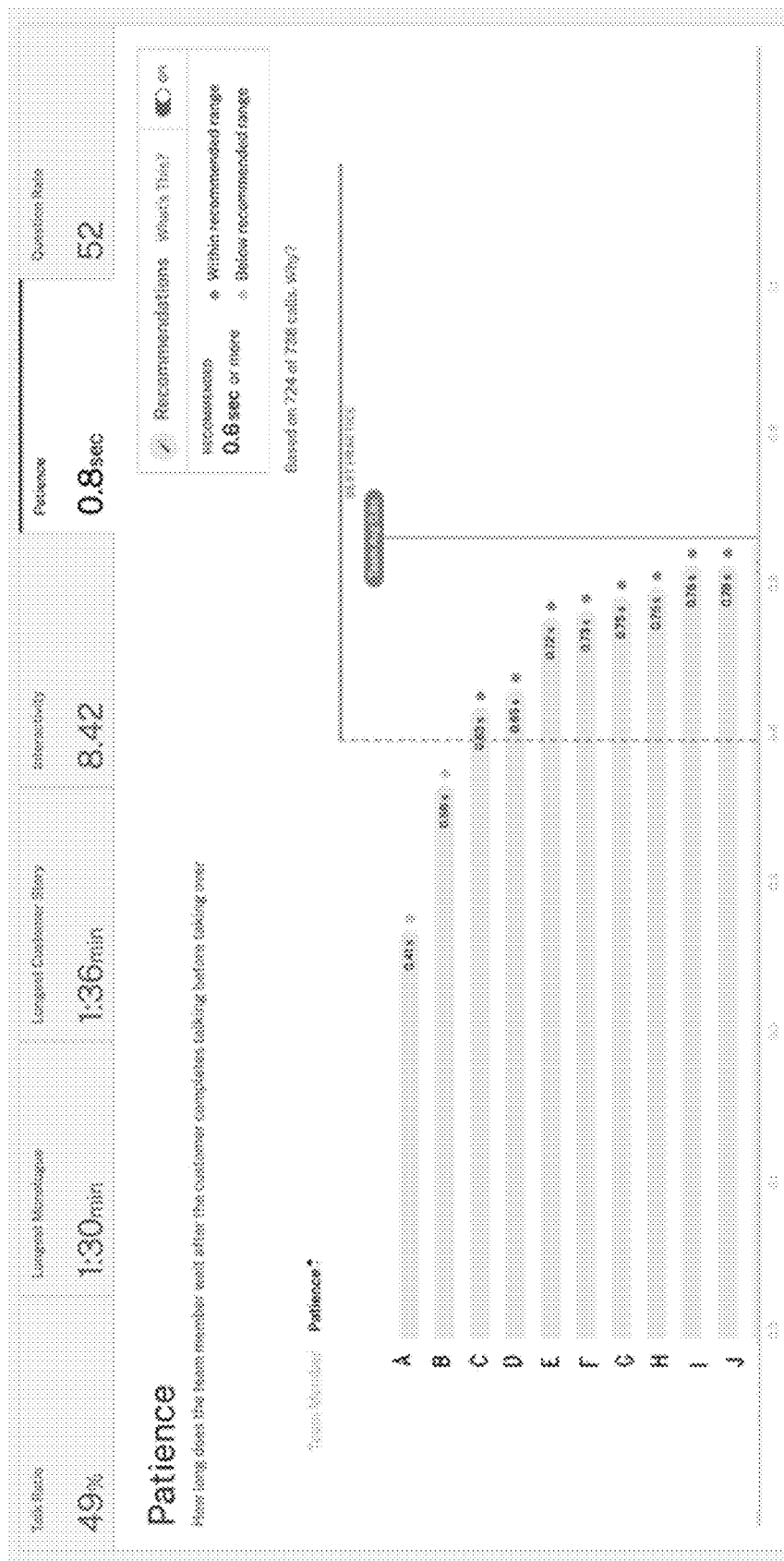

In FIG. 7E, a patience indicator is provided, indicating how long the individual pauses during a speech to allow others to respond, before resuming active speech. Due to the increased accuracy of the diarization as a result of the improved diarization systems and methodologies herein, such measure of patience, for example by a particular seller A-J on the call, may advantageously be computed with a high level of accuracy, and with a high degree of confidence that determined changes in speakers (for example, from a customer, to a period of silence of a known or determinable or measurable length (for example based on associated timestamps), to the particular seller A-J) are accurately determined. Such accurate patience measure is sufficient to draw fine distinctions between good sales practices by such sellers and poor sales practices that are not in line with best practices, for example with a best practice being indicated with a dotted line as shown towards the center of FIG. 7E. Given that such distinctions may be important to retention, promotion, and coaching decisions, such accuracy in the ultimate determination and the diarization data upon which it is based may be of great importance.

Figure 7F:
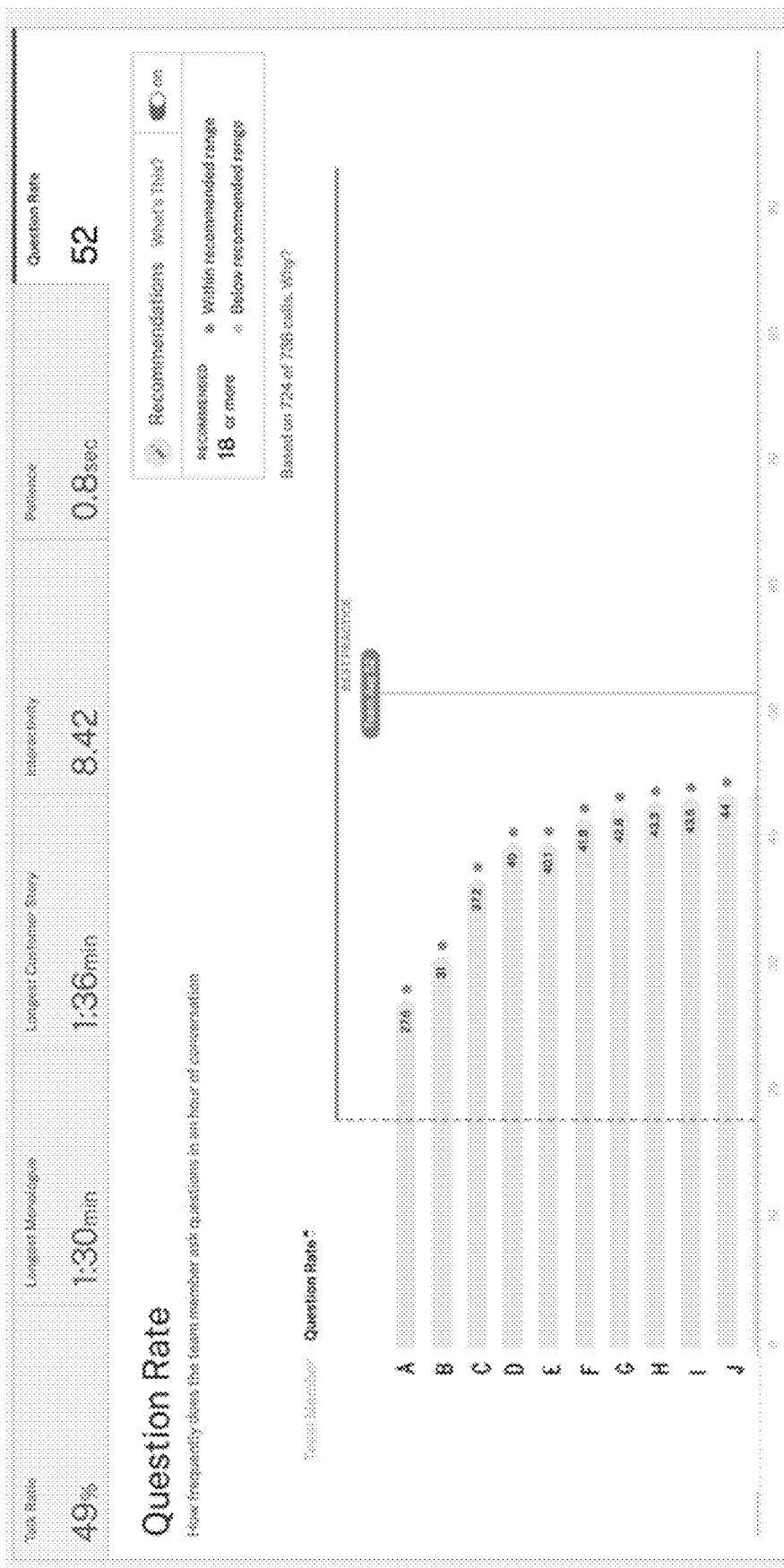

In FIG. 7F, a question rate is provided, indicating how often (for example, how many times per hour) each individual poses questions (the existence of which may be determined for example according to an NLP model, carried out for example by a machine learning algorithm trained on a training set of statements tagged with whether or not they are questions). Due to the increased accuracy of the diarization as a result of the improved diarization systems and methodologies herein, for example both with respect to who is making a statement and with respect to the content of such statement, a question rate, for example, an indication of questions per unit time uttered by a particular seller A-J on the call, may advantageously be computed with a high level of accuracy, and with a high degree of confidence that the question was not in fact by another speaker on the call. Such accurate question rate measure is sufficient to draw fine distinctions between good sales practices by such sellers and poor sales practices that are not in line with best practices, for example with a best practice being indicated with a dotted line as shown towards the left of FIG. 7F. Given that such distinctions may be important to retention, promotion, and coaching decisions, such accuracy in the ultimate determination and the diarization data upon which it is based may be of great importance.

Figure 7G:
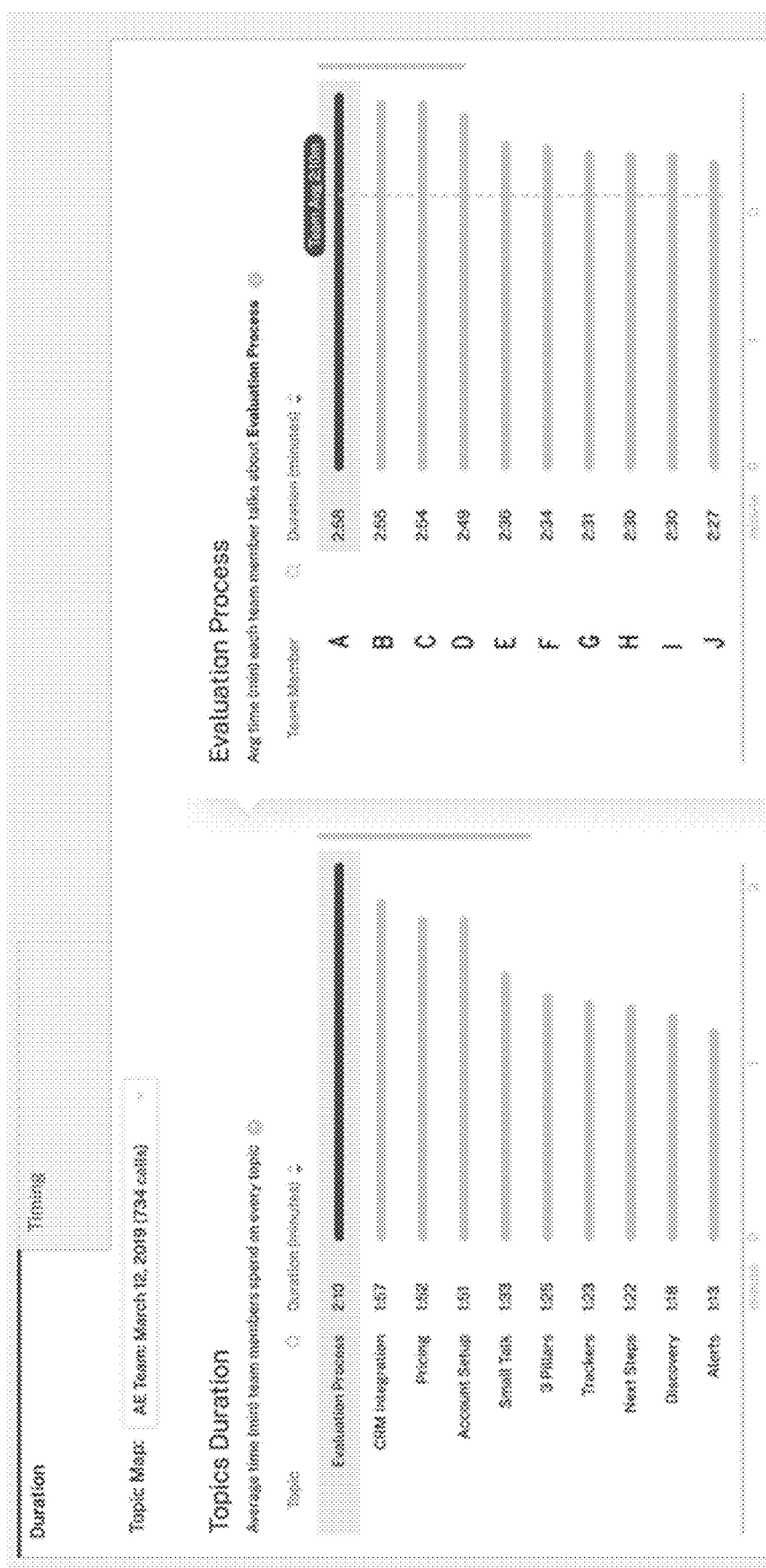

In FIG. 7G, a topic's duration and specific information for an individual topic or topics is provided, indicating, for example for a team and for individuals respectively, how long they spoke about particular topics (which again may be identified based on, for example, an NLP model). A variety of terminology accordingly may be determined to be associated with, and to result in an identification of, a particular topic. Due to the increased accuracy of the diarization as a result of the improved diarization systems and methodologies herein, for example both with respect to who is making a statement and with respect to the content of such statement, such information, for example, an indication of how long various topics are discussed by a class of individuals (e.g. sellers) or particular individuals (e.g. specific sellers A-J) on the call, may advantageously be computed with a high level of accuracy, and with a high degree of confidence that the topic was not in fact by another speaker or type of user (e.g. a buyer) on the call. Such accurate topics duration measures is sufficient to obtain an accurate assessment of whether each individual is adequately addressing particular topics of importance (and avoiding topics of lesser importance), and determining whether individuals may be conforming to or diverging from averages across a seller team (indicated with a dotted line towards the right of FIG. 7G). Given that such distinctions may be important to retention, promotion, and coaching decisions, such accuracy in the ultimate determination and the diarization data upon which it is based may be of great importance.

Figure 7H:
Figure 71:
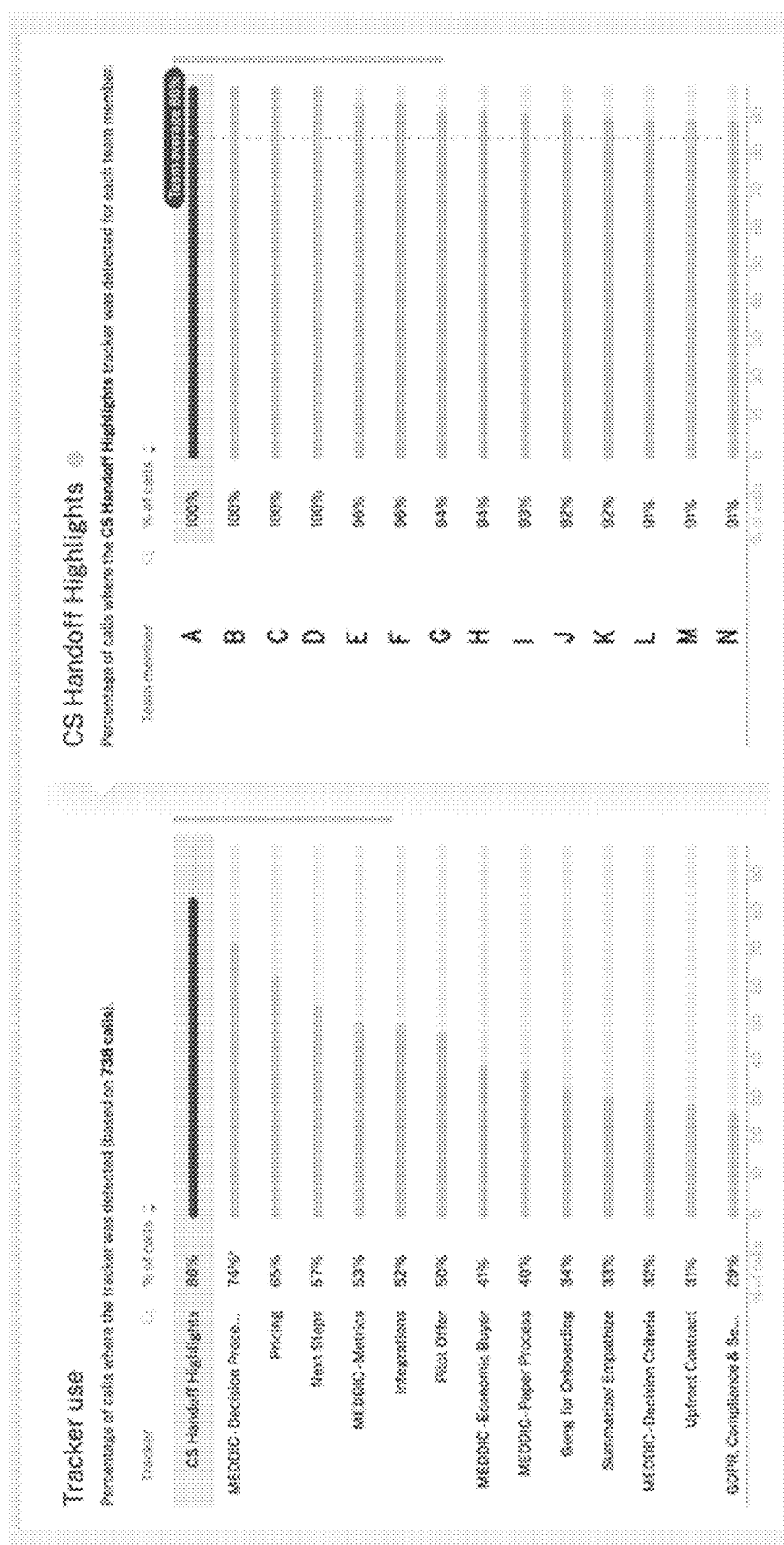

In FIG. 7H, topic timing is providing, for example for a particular selected topic (e.g., a deals page walkthrough). The topic of interest may be selected by a user, for example using one or more dropdown menus. The display may show, visually for example according to a timeline, where particular topics tend to be brought up in calls, for example, on average across many calls and across many users. This timeline may also be used for selection of other topics, for example by clicking on various identified points in the timeline, a bar chart may be provided showing where topics tend to be brought up by various users, for example along with a team average. Due to the increased accuracy of the diarization as a result of the improved diarization systems and methodologies herein, for example both with respect to who is making a statement and with respect to the content of such statement, such information, for example, an indication of how long various topics are discussed by particular individuals (e.g. specific sellers A-J) on the call, as well as visual demonstrations of where on the call various topics may be discussed, may advantageously be computed with a high level of accuracy. Such accurate topics duration measures are sufficient to obtain an accurate assessment of whether each individual is adequately addressing particular topics of importance (and avoiding topics of lesser importance), and determining whether individuals may be conforming to or diverging from averages across a seller team (indicated with a "Team Avg" line towards the center of FIG. 7H), as well as obtaining a quick and accurate visual overview of the overall topic flow of a call or average across a number of calls.

In FIG. 7I, tracker use and specific information about for an individual tracker or trackers is provided, indicating, for example for a team and for individuals respectively, how often a particular topic was determined by a tracker to be mentioned across a plurality of calls. Such trackers may be identified according to the mention of a particular key word or key words by the individual or team during the call. Key words may be set, for example, by an individual or organizational user. Topic discussion and use of particular trackers may be evaluated for correspondence with a measure of success (e.g. a closed sale), and recommendations may be provided (for example on the interface) as to suggested topics and trackers to use during calls or teleconferences. The call participants shown in such interfaces may be all individuals tracked by the system, individuals on particular calls, or a limited subset of all individuals tracked by the system, for example, members of a sales team. Due to the increased accuracy of the diarization as a result of the improved diarization systems and methodologies herein, such information, for example, which of several sellers A-N may be uttering a particular tracked expression (as opposed to some other speaker, such as a customer, for example) may advantageously be determined with a high level of accuracy. Such accurate topics duration measures is sufficient to obtain an accurate assessment of whether each individual is adequately mentioning particular keywords of importance (and avoiding keywords of lesser importance), and determining whether individuals may be conforming to or diverging from averages across a seller team (indicated with a dotted line towards the right of FIG. 7I). Given that such distinctions may be important to retention, promotion, and coaching decisions, such accuracy in the ultimate determination and the diarization data upon which it is based may be of great importance.

The processor(s) of the server 101, for example, may correlate the talk times with sales statistics for each of the salespeople, taken from a customer relations management (CRM) database of an organization, for example. On this basis, the processor(s) may identify optimal or beneficial speech patterns, such as optimal or suggested or best practice talk time, team average talk time, and other parameters, for increasing or maximizing the productivity of sales calls. The salespeople may then receive feedback and coaching on their conversational habits that will enable them to increase their sales productivity.

According to exemplary embodiments, and with reference again to FIG. 6, at step S610 a call to action may be generated, for example by the processor(s) of the server 101. This call to action may be based on the labeling, for example performed at substep S608C, which labeling may provide an improved understanding of which speakers are associated with which portions of the conference.

According to exemplary embodiments, one or more of various calls to action may be employed, for example those discussed above in connection with FIGS. 7A-H and those discussed below:

Statistics and Coaching

In exemplary embodiments, users may, for example from the processor(s) of the server 101 communicating over the network 102, receive user recommendations about how to improve their conversations, with such recommendations being a form of call to action. For example, a user such as a salesperson may be instructed to "talk less" or "have more patience before replying", e.g. based on analyses as discussed above in connection with the various parameters. Determinations may be made as to what aspects of or statements on teleconferences tend to be associated with top-performing salespeople or with closed deals. Analyses may be provided, for example, with respect to duration (e.g. average duration) of various topics, a ratio of talking between various participants, and a rate of questions being asked (for example, by salespeople or by customers). Information regarding particular salespeople or customers of note, for example, the fact that an individual salesperson talks significantly more than the average salesperson about a particular topic, may also be presented, potentially along with an indication that such salesperson is a top performer. Coaching materials may be selected and sent to individuals, for example materials directed to subject matter that a salesperson has been identified as having associated performance deficiencies. Analyses may also be presented of how often known competitors are discussed, for example by customers, on teleconferences. Deal size may also be included in these analyses, for example, presenting a chart showing an association between mention of certain topics and average deal size.

Decisionmaker Involvement

In exemplary embodiments, the system may, as a further call to action, highlight the involvement or need to involve decisionmakers, such as those determined to have spending authority, and provide an associated alert that such decisionmaker is either present ("e.g. Janet Foe is a decisionmaker on this teleconference") or not present during a teleconference (e.g. "You're talking to many people, but none of them is a decisionmaker"). Titles of individuals may be obtained for this purpose from sources such as titles extracted from statements on the call, email signatures, electronic calendar invites, or databases which may be created that associate individuals and their titles. Such titles may be used, for example by a neural network trained as to whether persons having various titles are decisionmakers, to identify whether the individuals are decisionmakers. Analyses may be performed and presented, for example for coaching purposes, of the sales effect of having persons who are decisionmakers or who have particular titles, on a teleconference. For example, a particular higher win or sales closure rate with respect to engaging with someone of director-level or above, may be presented.

Identification of Objections and Questions

In exemplary embodiments, the system may, as a further call to action, highlight questions asked or objections raised by a teleconference participant such as a customer, and provide a prompt to a user with respect to such questions and/or objections. Advantageously, providing such information may aid in for example in the creation by salespeople of a deal proposal and in making sure all relevant questions are addressed. Objections may be identified by example by keyword or key phrase (for example, "I'm afraid" or "unfortunately"), for example through a fixed heuristic or algorithmic rule, or through comparison of portions of speech with a neural network trained on a data set of known or suspected objection speech, for example in the form of sentences or approximately sentence-length utterances, that has been tagged as such, in combination with a data set of known or suspected non-objection speech, again tagged as such. Similarly, questions may be identified by a neural network trained on a data set of questions (for example, if provided in audio form, this may allow for detection of voice inflection that is question indicative), or through syntactical analysis of transcripts. Syntactical analysis of transcripts may be accomplished using an NLP-task focused neural network focused on such semantic understanding, for example of sentences, and through obtaining a classifier as to whether it is an objection or a question. A list of objections, for example those occurring during a particular teleconference, may be created, and such list may be used in connection with calls-to-action (e.g. "Jimmy Loe asked 'what is the function of this product?'" or "John Doe objected, 'Can't do it, too pricy'"). Titles may be considered in determining whether an objection should be included in a list, for example, only including objections voiced by decisionmakers or by upper-level management (the classification for which may be determined by neural network trained for such purposes, or from consulting a database such as a CRM maintained with such associations between titles and decisionmaker or upper-level management or other relevant status). Based on the particular objections, helpful sales materials, such as decks or case studies, may be, for example, provided to the salesperson, or provided in a tailored email as discussed below.

Tailored Email Creation

In exemplary embodiments, the system may, as a further call to action, generate a draft or send a tailored email or other form of correspondence such as a voicemail or SMS or letter, to one or more or all meeting attendees at a teleconference, for example, all attendees determined to be customers. For example, contextual information, for example regarding the position of an individual, and questions or objections posed by such individual, may be used in determining the content of such email. For example, if a person on a call is determined to be a lawyer and to have asked a particular question, then a legally-related email may be drafted or sent along the lines of "Hi Marie, In our call today, you asked if we were compliant with the Illinois Act. Accordingly, I am attaching here, for you to review with your client, a copy of this Act and our website pages discussing this Act."

Deal Assessment

In exemplary embodiments, an estimate may be provided as to a probability of closing a deal discussed on a particular call, for example by employing machine learning using a neural network with a training set of other call transcripts tagged with whether or not the associated deal closed in the cases associated with those other calls. For example, an indication may be provided that "Based on our analysis, we believe the chances of this deal closing are 73%, so please schedule a follow-up call soon." In exemplary embodiments, an assessment may be provided as to an extent of contact with a particular person or organization associated with a deal, based for example on determined talk time on a call or a collection of calls. Assessments may be provided as to an expected timing of when a deal may close.

In an exemplary embodiment, there is a method for uniquely identifying one or more respective participants among a plurality of participants in a first recorded teleconference, the method involving (a) obtaining, by a computer system, components of the first recorded teleconference among the plurality of participants conducted over a network, the components including: (1) an audio component including utterances of respective participants that spoke during the first recorded teleconference, (2) a video component including a video feed as to respective participants that spoke during the first recorded teleconference, (3) teleconference metadata associated with the first recorded teleconference and including a first plurality of timestamp information and respective speaker identification information associated with each respective timestamp information, (4) transcription data associated with the first recorded teleconference, the transcription data being indexed by timestamps, (b) parsing, by the computer system, the audio component into a plurality of speech segments in which one or more participants were speaking during the first recorded teleconference, each respective speech segment being associated with a respective time segment including a start timestamp indicating a first time in the telephone conference when the respective speech segment begins, and a stop timestamp associated with a second time in the telephone conference when the respective speech segment ends, (c) tagging, by the computer system, each respective speech segment with the respective speaker identification information based on the teleconference metadata associated with the respective time segment, and (d) diarizing the first recorded teleconference, by the computer system, in a process including: (1) indexing, by the computer system, the transcription data in accordance with respective speech segments and the respective speaker identification information to generate a segmented transcription data set for the first recorded teleconference, (2) identifying, by the computer system, respective speaker information associated with respective speech segments using a neural network with at least a portion of the segmented transcription data set determined according to the indexing as an input, and a source indication as an output and a training set including transcripts or portions of transcripts tagged with source indication information, and (3) labeling, by the computer system, each respective speech segment based on the identified respective speaker information associated with the respective speech segment.

In a further exemplary embodiment, the audio component may be a single file including utterances of each respective participant that spoke during the first recorded teleconference. In a further exemplary embodiment, the audio component may include a plurality of audio components, and each of the plurality of audio components may be associated with a separate feed during the first recorded teleconference. In an exemplary embodiment, the video component may be a single file including video of each respective participant that spoke during the first recorded teleconference. In an exemplary embodiment, the video component may include a plurality of video components, each of the plurality of video components being associated with a separate feed during the first recorded teleconference. IN a further exemplary embodiment, at least one of the plurality of video components may further include a still screen identifying a respective participant from amongst the plurality of participants that spoke during the first recorded teleconference associated with a respective separate feed.

In an exemplary embodiment, the video component may include a video showing one or more of the plurality of participants that spoke during the first recorded teleconference. In an exemplary embodiment, the teleconference metadata may be generated by the computer system. In an exemplary embodiment, the teleconference metadata may be generated by the computer system based on a presumed or preliminary identity of one or more of the plurality of participants. In an exemplary embodiment, the transcription data is generated by the computer system.

In an exemplary embodiment, the method further involves tracking, by the computer system, a relative ordering of chronologically adjacent speech segments from amongst the plurality of speech segments. In a further exemplary embodiment, the relative ordering of chronologically adjacent speech segments may be used, by the computer system, in the identifying of the respective speaker information.

In an exemplary embodiment, at least one of the plurality of speech segments may be separated from at least one other of the plurality of speech segments by an interval of silence in the audio component. In an exemplary embodiment, the audio component may be included in an audio-video file. In an exemplary embodiment, the video component may be included in an audio-video file. In an exemplary embodiment, the audio component and the video component are each included in an audio-video file.

In an exemplary embodiment, the neural network may be an artificial neural network.

In an exemplary embodiment, the neural network may be a deep neural network. In a further exemplary embodiment, the deep neural network may have at least one convolutional neural network layer.

In an exemplary embodiment, the neural network may have a transformer architecture and include an attention mechanism.

In an exemplary embodiment, the training set may further include commonly uttered terms tagged with source identification information. In a further exemplary embodiment, the source identification information may indicate a role.

In an exemplary embodiment, the training set may further include data regarding a participant from amongst the plurality of participants tagged with source identification information indicating an identity of the participant.

In an exemplary embodiment, the method further involves generating, by the computer system, a call to action based on the labeling. In further exemplary embodiments, the call to action may be or include at least one of providing a recommendation to a user as to how to improve conversations, generating an indication as to whether a decision-maker is present at the first recorded teleconference, generating a list of objections, generating a tailored email, and generating an assessment as to the probability of a deal closing.

In an exemplary embodiment, the first recorded teleconference may be a streaming teleconference.

In an exemplary embodiment, the respective speaker identification information associated with at least one of the respective timestamp information may identify an absence of any speakers. In an exemplary embodiment, the respective speaker identification information associated with at least one of the respective timestamp information may identify one speaker among the plurality of participants. In an exemplary embodiment, the respective speaker identification information associated with at least one of the respective timestamp information may identify multiple speakers among the plurality of participants. In a further exemplary embodiment, the neural network may be selectively used for the identifying of the respective speaker information associated with a respective speech segment according to whether respective speaker identification information of the teleconference metadata identifies multiple speakers among the plurality of participants.

In an exemplary embodiment, at least one of the first plurality of timestamp information includes a single timestamp. In an exemplary embodiment, at least one of the first plurality of timestamp information includes a commencing timestamp associated with a concluding timestamp.

In an exemplary embodiment, the transcripts or portions of transcripts included in the training set may include a plurality of transcripts. In an exemplary embodiment, the transcripts or portions of transcripts included in the training set include a plurality of portions of transcripts.

In an exemplary embodiment, the step of identifying respective speaker information associated with respective speech segments may further include identifying a participant from among the plurality of participants based on a unique identification of the participant in the source indication.

In an exemplary embodiment, the step of identifying respective speaker information associated with respective speech segments, may further include identifying a participant from among the plurality of participants based on an additional processing using a characteristic of the participant in the source indication that is not a unique identification of the participant.

In an exemplary embodiment, the input to the neural network further may include at least a portion of the utterances of respective participants. In an exemplary embodiment, the input to the neural network may further include at least a portion of the video feed.

In an exemplary embodiment, the identifying the respective speaker information associated with speech segments further includes: (a) searching through text in at least a portion of the segmented transcription data set determined according to the indexing, so as to determine a set of one or more commonly uttered expressions, and (b) determining a second source indication based on the set of commonly uttered expressions based on a mapping between the commonly uttered expressions and one or more roles, and the identifying the respective speaker information may be based on the source indication as output by the neural network and the second source indication.

In exemplary embodiments, the method further includes performing an analysis, by the computer system, of the diarization of the first recorded teleconference, and providing, by the computer system, results of such analysis to a user. In exemplary embodiments, the analysis, by the computer system, of the diarization of the first recorded teleconference, includes determining conversation participant talk times, determining conversation participant talk ratios, determining conversation participant longest monologues, determining conversation participant longest uninterrupted speech segments, determining conversation participant interactivity, determining conversation participant patience, determining conversation participant question rates, or determining a topic duration. In exemplary embodiments the analyzing by the computer system the diarization of the first recorded teleconference, includes determining a frequency with which predetermined key words are mentioned by conversation participants.

In an exemplary embodiment, there is a method for uniquely identifying one or more respective participants among a plurality of participants in a first recorded teleconference, the method including: (a) obtaining, by a computer system, components of the first recorded teleconference among the plurality of participants conducted over a network, the components including: (1) an audio component including utterances of respective participants that spoke during the first recorded teleconference, (2) a video component including a video feed as to respective participants that spoke during the first recorded teleconference, (3) teleconference metadata associated with the first recorded teleconference and including a first plurality of timestamp information and respective speaker identification information associated with each respective timestamp information, (4) transcription data associated with the first recorded teleconference, wherein said transcription data is indexed by timestamps, (b) parsing, by the computer system, the audio component into a plurality of speech segments in which one or more participants were speaking during the first recorded teleconference, each respective speech segment being associated with a respective time segment including a start timestamp indicating a first time in the telephone conference when the respective speech segment begins, and a stop timestamp associated with a second time in the telephone conference when the respective speech segment ends, (c) tagging, by the computer system, each respective speech segment with the respective speaker identification information based on the teleconference metadata associated with the respective time segment, and (d) diarizing the first recorded teleconference, by the computer system, in a process including: (1) indexing, by the computer system, the transcription data in accordance with respective speech segments and the respective speaker identification information to generate a segmented transcription data set for the first recorded teleconference, (2) identifying, by the computer system, respective speaker information associated with respective speech segments by: (a) searching through text in at least a portion of the segmented transcription data set determined according to the indexing, so as to determine a set of one or more commonly uttered expressions, (b) determining a source indication based on the set of commonly uttered expressions based on a mapping between the commonly uttered expressions and one or more roles, and (c) identifying the respective speaker information associated with respective speech segments based on the source indication, and (3) labeling, by the computer system, each respective speech segment based on the identified respective speaker information associated with the respective speech segment.

In a further exemplary embodiment, the audio component may be a single file including utterances of each respective participant that spoke during the first recorded teleconference. The audio component may include a plurality of audio components, and each of the plurality of audio components may be associated with a separate feed during the first recorded teleconference.

In an exemplary embodiment, the video component may be a single file including video of each respective participant that spoke during the first recorded teleconference. In an exemplary embodiment, the video component may include a plurality of video components, each of the plurality of video components being associated with a separate feed during the first recorded teleconference. In a further exemplary embodiment, at least one of the plurality of video components may further include a still screen identifying a respective participant from amongst the plurality of participants that spoke during the first recorded teleconference associated with a respective separate feed.

In an exemplary embodiment, the video component may include a video showing one or more of the plurality of participants that spoke during the first recorded teleconference.

In an exemplary embodiment, the teleconference metadata may be generated by the computer system. In an exemplary embodiment, the teleconference metadata may be generated by the computer system based on a presumed or preliminary identity of one or more of the plurality of participants. In an exemplary embodiment, the transcription data may be generated by the computer system.

In an exemplary embodiment, at least one of the plurality of speech segments may be separated from at least one other of the plurality of speech segments by an interval of silence in the audio component.

In an exemplary embodiment, the audio component may be included in an audio-video file. In an exemplary embodiment, the video component may be included in an audio-video file.

In an exemplary embodiment, the audio component and the video component may each be included in an audio-video file.

In an exemplary embodiment, the method may further include generating, by the computer system, a call to action based on the labeling.

In an exemplary embodiment, the first recorded teleconference may be a streaming teleconference. In an exemplary embodiment, the respective speaker identification information associated with at least one of the respective timestamp information may identify an absence of any speakers. In an exemplary embodiment, the respective speaker identification information associated with at least one of the respective timestamp information may identify one speaker among the plurality of participants. In an exemplary embodiment, the respective speaker identification information associated with at least one of the respective timestamp information may identify multiple speakers among the plurality of participants.

In an exemplary embodiment, the identifying the speaker information associated with a respective speech segment may be selectively performed according to whether respective speaker identification information of the teleconference metadata identifies multiple speakers among the plurality of participants.

In an exemplary embodiment, at least one of the first plurality of timestamp information may include a single timestamp. In an exemplary embodiment, at least one of the first plurality of timestamp information may include a commencing timestamp associated with a concluding timestamp.

In an exemplary embodiment, the step of identifying respective speaker information associated with respective speech segments may further include identifying a participant from among the plurality of participants based on an additional processing using the source indication.

Now that embodiments of the present invention have been shown and described in detail, various modifications and improvements thereon can become readily apparent to those skilled in the art. Accordingly, the exemplary embodiments of the present invention, as set forth above, are intended to be illustrative, not limiting. The spirit and scope of the present invention is to be construed broadly.

What is claimed is:

1. A method for uniquely identifying one or more respective participants among a plurality of participants in a first recorded teleconference, the method comprising:
   (a) obtaining, by a computer system, components of the first recorded teleconference among the plurality of participants conducted over a network, wherein the components include:
      (1) an audio component including utterances of respective participants that spoke during the first recorded teleconference;
      (2) a video component including a video feed as to respective participants that spoke during the first recorded teleconference;
      (3) teleconference metadata associated with the first recorded teleconference and including a first plurality of timestamp information and respective speaker identification information associated with each respective timestamp information;
      (4) transcription data associated with the first recorded teleconference, wherein said transcription data is indexed by timestamps;
   (b) parsing, by the computer system, the audio component into a plurality of speech segments in which one or more participants were speaking during the first recorded teleconference, wherein each respective speech segment is associated with a respective time segment including a start timestamp indicating a first time in the first recorded teleconference when the respective speech segment begins, and a stop timestamp associated with a second time in the first recorded teleconference when the respective speech segment ends;
   (c) tagging, by the computer system, each respective speech segment with the respective speaker identification information based on the teleconference metadata associated with the respective time segment; and
   (d) diarizing the first recorded teleconference, by the computer system, in a process comprising:
      (1) indexing, by the computer system, the transcription data in accordance with respective speech segments and the respective speaker identification information to generate a segmented transcription data set for the first recorded teleconference;
      (2) identifying, by the computer system, respective speaker information associated with respective speech segments using a neural network with at least a portion of the segmented transcription data set determined according to the indexing as an input, and a source indication as an output and a training set including transcripts or portions of transcripts tagged with source indication information; and
      (3) labeling, by the computer system, each respective speech segment based on the identified respective speaker information associated with the respective speech segment.

2. The method of claim 1, wherein the audio component is a single file including utterances of each respective participant that spoke during the first recorded teleconference.

3. The method of claim 1, wherein the teleconference metadata is generated by the computer system.

4. The method of claim 1, wherein the transcription data is generated by the computer system.

5. The method of claim 1, further comprising tracking, by the computer system, a relative ordering of chronologically adjacent speech segments from amongst the plurality of speech segments.

6. The method of claim 5, wherein the relative ordering of chronologically adjacent speech segments is used, by the computer system, in the identifying of the respective speaker information.

7. The method of claim 1, wherein the training set further includes commonly uttered terms tagged with source identification information.

8. The method of claim 7, wherein the source identification information indicates a role.

9. The method of claim 1, wherein the training set further includes data regarding a participant from amongst the plurality of participants tagged with source identification information indicating an identity of the participant.

10. The method of claim 1, further comprising the step of:
    (e) generating, by the computer system, a call to action based on the labeling.

11. The method of claim 10, wherein the call to action provides a recommendation to a user as to how to improve conversations.

12. The method of claim 10, wherein the call to action includes an indication as to whether a decisionmaker is present at the first recorded teleconference.

13. The method of claim 1, wherein the respective speaker identification information associated with at least one of the respective timestamp information identifies multiple speakers among the plurality of participants.

14. The method of claim 13, wherein the neural network is selectively used for the identifying of the respective speaker information associated with a respective speech segment according to whether respective speaker identification information of the teleconference metadata identifies multiple speakers among the plurality of participants.

15. The method of claim 1, wherein the input to the neural network further includes at least a portion of the utterances of respective participants.

16. The method of claim 1, wherein the identifying the respective speaker information associated with speech segments further comprises:
    a. searching through text in at least a portion of the segmented transcription data set determined according to the indexing, so as to determine a set of one or more commonly uttered expressions; and
    b. determining a second source indication based on the set of commonly uttered expressions based on a mapping between the commonly uttered expressions and one or more roles,
       wherein the identifying the respective speaker information is based on the source indication as output by the neural network and the second source indication.

17. The method of claim 1, further comprising analyzing, by the computer system, the diarization of the first recorded teleconference, and providing, by the computer system, results of such analysis to a user.

18. The method of claim 17, wherein the step of analyzing by the computer system, the diarization of the first recorded teleconference, comprises:
- determining conversation participant talk times,
- determining conversation participant talk ratios,
- determining conversation participant longest monologues,
- determining conversation participant longest uninterrupted speech segments,
- determining conversation participant interactivity,
- determining conversation participant patience,
- determining conversation participant question rates, or,
- determining a topic duration.

19. A method for uniquely identifying one or more respective participants among a plurality of participants in a first recorded teleconference, the method comprising:
  (a) obtaining, by a computer system, components of the first recorded teleconference among the plurality of participants conducted over a network, wherein the components include:
    (1) an audio component including utterances of respective participants that spoke during the first recorded teleconference;
    (2) a video component including a video feed as to respective participants that spoke during the first recorded teleconference;
    (3) teleconference metadata associated with the first recorded teleconference and including a first plurality of timestamp information and respective speaker identification information associated with each respective timestamp information;
    (4) transcription data associated with the first recorded teleconference, wherein said transcription data is indexed by timestamps;
  (b) parsing, by the computer system, the audio component into a plurality of speech segments in which one or more participants were speaking during the first recorded teleconference, wherein each respective speech segment is associated with a respective time segment including a start timestamp indicating a first time in the first recorded teleconference when the respective speech segment begins, and a stop timestamp associated with a second time in the first recorded teleconference when the respective speech segment ends;
  (c) tagging, by the computer system, each respective speech segment with the respective speaker identification information based on the teleconference metadata associated with the respective time segment; and
  (d) diarizing the first recorded teleconference, by the computer system, in a process comprising:
    (1) indexing, by the computer system, the transcription data in accordance with respective speech segments and the respective speaker identification information to generate a segmented transcription data set for the first recorded teleconference;
    (2) identifying, by the computer system, respective speaker information associated with respective speech segments by:
      a. searching through text in at least a portion of the segmented transcription data set determined according to the indexing, so as to determine a set of one or more commonly uttered expressions;
      b. determining a source indication based on the set of commonly uttered expressions based on a mapping between the commonly uttered expressions and one or more roles; and
      c. identifying the respective speaker information associated with respective speech segments based on the source indication; and
    (4) labeling, by the computer system, each respective speech segment based on the identified respective speaker information associated with the respective speech segment.

20. The method of claim 19, wherein the audio component is a single file including utterances of each respective participant that spoke during the first recorded teleconference.

* * * * *